(12) United States Patent
Yang et al.

(10) Patent No.: US 10,373,087 B1
(45) Date of Patent: Aug. 6, 2019

(54) SYSTEM AND METHOD FOR OPTIMALLY MANAGING AIRCRAFT ASSETS

(71) Applicant: American Airlines, Inc., Fort Worth, TX (US)

(72) Inventors: Su-hsia Yang, Irving, TX (US); June Ma, Colleyville, TX (US); Mei Zhang, Lewisville, TX (US); Hadi Purnomo, Phoenix, AZ (US); Louis Matthew Pfeifer, Arlington, TX (US)

(73) Assignee: American Airlines, Inc., Fort Worth, TX (US)

( * ) Notice: Subject to any disclaimer, the term of this patent is extended or adjusted under 35 U.S.C. 154(b) by 926 days.

(21) Appl. No.: 14/249,831

(22) Filed: Apr. 10, 2014

Related U.S. Application Data

(60) Provisional application No. 61/811,406, filed on Apr. 12, 2013.

(51) Int. Cl.
  *G06Q 10/00* (2012.01)
  *G06Q 10/06* (2012.01)

(52) U.S. Cl.
  CPC .............................. *G06Q 10/06315* (2013.01)

(58) Field of Classification Search
  CPC .......................................... G06Q 10/00–50/00
  USPC ................................................. 705/7.11–7.42
  See application file for complete search history.

(56) References Cited

U.S. PATENT DOCUMENTS

| | | | | |
|---|---|---|---|---|
| 5,216,612 | A * | 6/1993 | Cornett | G05B 19/4184 700/96 |
| 5,343,388 | A * | 8/1994 | Wedelin | G06Q 10/06 705/7.13 |
| 6,260,047 | B1 * | 7/2001 | Fox | G06Q 10/087 700/106 |
| 6,311,093 | B1 * | 10/2001 | Brown | G05B 17/02 700/95 |
| 6,847,854 | B2 * | 1/2005 | Discenzo | G05B 13/024 700/28 |
| 6,961,687 | B1 * | 11/2005 | Myers, Jr. | G06Q 10/06 700/117 |
| 7,209,814 | B2 * | 4/2007 | Kipersztok | B64F 5/60 382/149 |
| 8,019,504 | B2 * | 9/2011 | Jamrosz | G06Q 10/06 701/3 |
| 8,260,652 | B1 * | 9/2012 | Silver | G06Q 10/06 705/308 |
| 8,275,522 | B1 * | 9/2012 | Groeneweg | G06Q 10/06 701/50 |
| 8,560,368 | B1 * | 10/2013 | Maity | G06Q 10/0631 705/7.13 |

(Continued)

OTHER PUBLICATIONS

]Liang, Zhe, Wanpracha Art Chaovalitwongse, and Huei Chuen Huang. "On a New Rotation Tour Network Model for Aircraft Maintenance Routing Problem." Transportation Science 45.1 (2011): 109-120. Applied Science & Technology Source. Web. Feb. 10, 2017.*

(Continued)

*Primary Examiner* — Alan S Miller
(74) *Attorney, Agent, or Firm* — Haynes and Boone, LLP

(57) ABSTRACT

A system and method for optimally managing aircraft assets according to which a maintenance activity, costs, and aircraft asset deposition are addressed. In one embodiment, the aircraft assets are aircraft and/or engines.

22 Claims, 11 Drawing Sheets

(56) References Cited

U.S. PATENT DOCUMENTS

| | | | |
|---|---|---|---|
| 8,849,690 B1* | 9/2014 | Yang | G06Q 10/06312 705/7.16 |
| 2002/0082966 A1* | 6/2002 | O'Brien | G06Q 10/06 705/36 R |
| 2004/0158772 A1* | 8/2004 | Pan | G06Q 10/06 714/14 |
| 2006/0173765 A1* | 8/2006 | Crowe | G06Q 20/108 705/35 |
| 2007/0112488 A1* | 5/2007 | Avery | G06Q 10/06 701/29.3 |
| 2007/0112576 A1* | 5/2007 | Avery | G06Q 10/06393 705/7.39 |
| 2009/0083050 A1* | 3/2009 | Eltman | G06Q 10/20 705/305 |
| 2009/0299789 A1* | 12/2009 | Black | G06Q 10/06 705/7.39 |
| 2010/0077046 A1* | 3/2010 | Rigal | G05B 23/0283 709/206 |
| 2010/0262442 A1* | 10/2010 | Wingenter | G06Q 10/04 705/7.38 |
| 2012/0059684 A1* | 3/2012 | Hampapur | G06Q 10/0635 705/7.28 |
| 2012/0130759 A1* | 5/2012 | Davenport | G06Q 10/0631 705/7.12 |
| 2013/0112807 A1* | 5/2013 | Cox | B64C 25/36 244/50 |
| 2014/0121885 A1* | 5/2014 | Schoonveld | G06Q 10/10 701/29.3 |
| 2018/0089600 A1* | 3/2018 | Fox | G06Q 10/0631 |

OTHER PUBLICATIONS

Joo, Seong-Jong. "Scheduling preventive maintenance for modular designed components: A dynamic approach." European Journal of Operational Research 192.2 (2009): 512-520.*

Smith, Clifford W., and Lee Wakeman. "Determinants of corporate leasing policy." The Journal of Finance 40.3 (1985): 895-908.*

Levine, Michael E. "Airline competition in deregulated markets: theory, firm strategy, and public policy." Yale J. on Reg. 4 (1986): 393.*

Johnston, David I. "Legal aspects of aircraft finance." J. Air L. & Com. 29 (1963): 299.*

Greenspon, Robert a. "Documentation of Aircraft Operating Leases." Int'l Bus. Law. 16 (1988): 227.*

* cited by examiner

Fig. 4

| | A | B | C | Q | R | BI | CO | CP |
|---|---|---|---|---|---|---|---|---|
| 1 | TotalCost_PV($K)= | 90818 | | TotalCost no Incentive_PV($K)= | 90818 | | | |
| 2 | | | | | | | | |
| 3 | TotalDockCost_NV($K) | 133157 | | DockCost_NV($K) | 1576.5 | 2318 | | 500.3 |
| 4 | TotalPenaltyRetireAfterHC_PV($K) | 195 | | penaltyRetireAfterHC_PV($K) | 13 | 0 | | 20 |
| 5 | TotalCostLRPerPeriod_PV($K) | 1871.2 | | CostLRPerPeriod_PV($K) | 10 | 0 | | 0 |
| 6 | TotalProceeds_NV($K) | 325 | | ProceedsFromSales_NV($K) | 17 | 0 | | 0 |
| 7 | TotalCostPerPeriod(no incentive)_PV($K) | 90608.2 | | CostPerPeriod(no Incentive)_PV($K) | 1601 | 1295 | | 181 |
| 8 | TotalCostPerPeriod_PV($K) | 90608.2 | | CostPerPeriod_PV($K) | 1601 | 1295 | | 181 |
| 9 | | | | | P0 | P43 | ooo | P75 |
| 10 | ACF | index | Ownership | | Feb14 | Sep17 | | May20 |
| 87 | | | | | | | | |
| 88 | 5AF | 52 | Own | | 1 | 1 preint_HC | | |
| 89 | 5AG | 9 | Own | | 1 | 1 | | |
| 90 | 5AM | 53 | Own | | 1 | 1 | | |

Input-Parameters / Output-DockSummary / Output-DockReport / Output-AircraftDetails

SYSTEM AND METHOD FOR OPTIMALLY MANAGING AIRCRAFT ASSETS

CROSS-REFERENCE TO RELATED APPLICATION

This application claims the benefit of the filing date of, and priority to, U.S. patent application No. 61/811,406, filed Apr. 12, 2013, the entire disclosure of which is hereby incorporated herein by reference.

BACKGROUND

The present disclosure relates in general to a system and method for optimally managing aircraft assets. In one embodiment, the aircraft assets are aircraft and/or engines.

BRIEF DESCRIPTION OF THE DRAWINGS

FIG. 4 is a diagrammatic illustration of the output device of FIG. 2 during the execution of a step of the method of FIG. 3, according to an exemplary embodiment.

FIG. 8 is a diagrammatic illustration of the output device of FIG. 2 during the execution of another step of the method of FIG. 3, according to an exemplary embodiment.

FIG. 10 is a diagrammatic illustration of the output device of FIG. 2 during the execution of a step of the method of FIG. 9, according to an exemplary embodiment.

DETAILED DESCRIPTION

Figure 1:
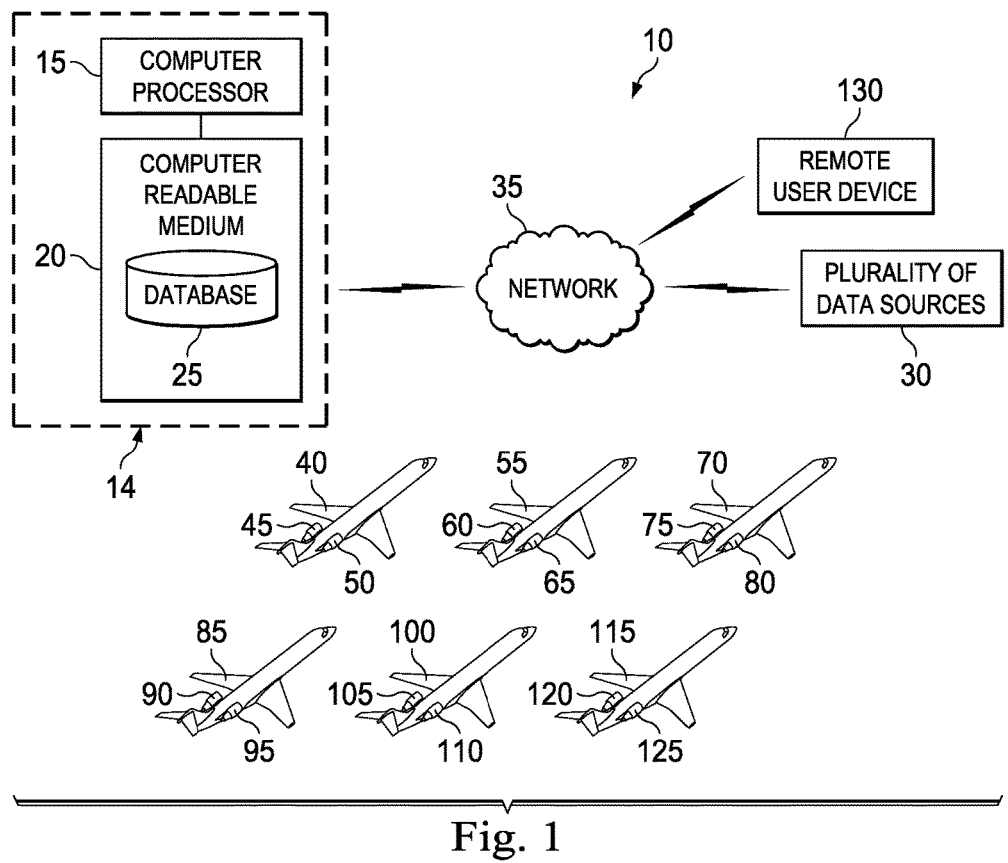
FIG. 1 is a diagrammatic illustration of a system according to an exemplary embodiment, the system including a remote user device.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, as illustrated in FIG. 1, a system is generally referred to by the reference numeral 10 and includes a functional module 14, which includes a computer processor 15 and a computer readable medium 20 operably coupled thereto. Instructions accessible to, and executable by, the computer processor 15 are stored on the computer readable medium 20. A database 25 is also stored in the computer readable medium 20. A plurality of data sources 30 is operably coupled to, and in communication with, the functional module 14 via a network 35. In one embodiment, the plurality of data sources 30 provides data relating to an aircraft 40 having engines 45 and 50; to an aircraft 55 having engines 60 and 65; to an aircraft 70 having engines 75 and 80; to an aircraft 85 having engines 90 and 95; to an aircraft 100 having engines 105 and 110; and to an aircraft 115 having engines 120 and 125. The aircraft 40, 55, 70, 85, 100, and 115 create an aircraft fleet. The engines 45, 50, 60, 65, 76, 80, 90, 95, 105, 110, 120 and 125 create an engine fleet. In one embodiment, the plurality of data sources 30 provides aircraft data and engine data. A remote user device 130 is operably coupled to, and in communication with, the functional module 14 via the network 35. In an exemplary embodiment, each of the aircraft 40, 55, 70, 85, 100, and 115 is an aircraft asset. In an exemplary embodiment, each of the engines 45, 50, 60, 65, 76, 80, 90, 95, 105, 110, 120 and 125 is an aircraft asset. In an exemplary embodiment, an airplane includes an aircraft and an engine. In an exemplary embodiment, an aircraft includes an engine.

In an exemplary embodiment, the functional module 14 is a web application server, which in several exemplary embodiments includes and/or executes one or more web-based programs, Intranet-based programs, and/or any combination thereof. In an exemplary embodiment, the network 35 includes the Internet, one or more local area networks, one or more wide area networks, one or more cellular networks, one or more wireless networks, one or more voice networks, one or more data networks, one or more communication systems, and/or any combination thereof.

Figure 2:
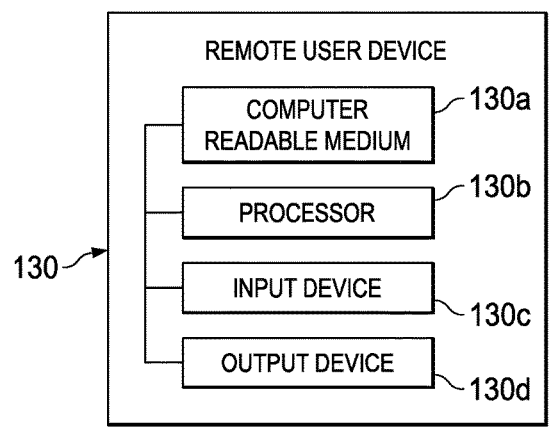
FIG. 2 is a diagrammatic illustration of the remote user device of FIG. 1 according to an exemplary embodiment, the remote user device including an output device.

In an exemplary embodiment, as illustrated in FIG. 2 with continuing reference to FIG. 1, the remote user device 130 includes a computer readable medium 130a, a processor 130b, an input device 130c, and an output device 130d. In an exemplary embodiment, instructions accessible to, and executable by, the processor 130b are stored in the computer readable medium 130a. In an exemplary embodiment, web browser software is stored in the computer readable medium 130a. In an exemplary embodiment, the input device 130c and the output device 130d include a graphical display, which, in several exemplary embodiments, is in the form of, or includes, one or more digital displays, one or more liquid crystal displays, one or more cathode ray tube monitors, and/or any combination thereof. In an exemplary embodiment, the output device 130d includes a graphical display, a printer, a plotter, and/or any combination thereof. In an exemplary embodiment, the input device 130c is the output device 130d, and the output device 130d is the input device 130c. In several exemplary embodiments, the remote user device 130 is a thin client and the functional module 14 controls at least a portion of the operation of the remote user device 130. In several exemplary embodiments, the remote user device 130 is a thick client. In several exemplary embodiments, the remote user device 130 functions as both a thin client and a thick client. In several exemplary embodiments, the remote user device 130 is, or includes, a telephone, a personal computer, a personal digital assistant, a cellular telephone, other types of telecommunications devices, other types of computing devices, and/or any combination thereof. In several exemplary embodiments, the remote user device 130 includes a plurality of remote user devices. In several exemplary embodiments, the remote user device 130 is, or at least includes, one or more of the functional module 14, the computer processor 15, the computer readable medium 20, the database 25 and/or any combination thereof.

In an exemplary embodiment, the system 10 includes a computer program including a plurality of instructions, data, and/or any combination thereof. In an exemplary embodiment, the system 10 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the system 10 is a web-based application written in, for example, Java or Adobe Flex, which pulls real-time information from the remote user device 130, the functional module 14, and/or the plurality of data sources 30. In an exemplary embodiment, the system 10 pulls real-time information from the remote user device 130, the functional module 14, and/or the plurality of data sources 30, upon the execution, opening or start-up of the system 10. In an exemplary embodiment, the system 10 is a web-based application written in, for example, Java or Adobe Flex, which pulls real-time information from the remote user device 130, the functional module 14, and/or the plurality of data sources 30, automatically refreshing with latest information every, for example, 45 seconds. In an exemplary embodiment, the computer program is stored on the computer readable medium 20 and/or in the database 25.

In an exemplary embodiment, the plurality of data sources 30 may include an engine contract file, an engine condition file, an engine plan file, an engine fleet plan file, an engine output file, an engine parked file, an initial SLRC file, an engines held file, an engines swapped file, an engine override file, an contract override file, an engine status code file, and upgrade rules. Additionally, the plurality of data sources 30 may include an aircraft contract file, an aircraft condition file, an aircraft plan file, an aircraft fleet plan file, an aircraft output file, an aircraft parked file, an aircraft held file, an aircraft override file, and an aircraft status code file. In an exemplary embodiment, the remote user device 130 is one of the plurality of data sources 30. That is, any data received from the remote user device 130 is considered to be received from the plurality of data sources 30.

Figure 3:
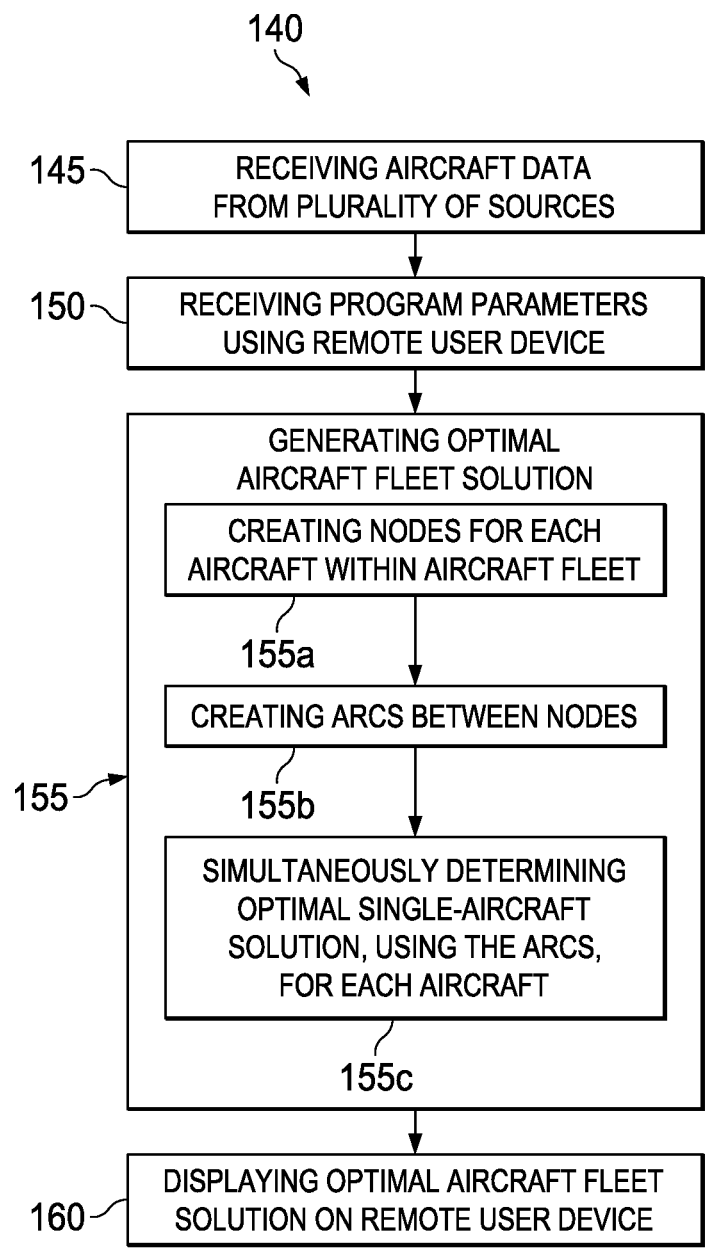
FIG. 3 is a flow chart illustration of a method of operating the system of FIG. 1, according to an exemplary embodiment.

In an exemplary embodiment, as illustrated in FIG. 3 with continuing reference to FIGS. 1 and 2, a method of generating an optimal aircraft fleet management solution, or optimal aircraft fleet solution, by operating the system 10, is generally referred to by the reference numeral 140. In one embodiment, the method 140 includes receiving aircraft data from the plurality of data sources 30 at step 145, receiving program parameters using the remote user device 130 at step 150, generating the optimal aircraft fleet solution at step 155, and displaying the optimal aircraft fleet solution at step 160.

In an exemplary embodiment, the system 10 receives the aircraft data from the plurality of data sources 30 at the step 145. In an exemplary embodiment, the aircraft data includes aircraft contract data, aircraft fleet plan data, aircraft dock-plan data, and aircraft cost data. In an exemplary embodiment, the aircraft contract data includes a tail number, a manufactured date, and an ownership status. In an exemplary embodiment, the ownership status is any one of "owned," "mortgaged," "financed," and "leased", which is associated with an "owned aircraft," a "mortgaged aircraft," a "financed aircraft," and a "leased aircraft," respectively. The "leased aircraft" status includes a "capital lease" status. The aircraft contract data also includes contract related data and conditions that are associated with each leased aircraft, financed aircraft, and mortgaged aircraft. In an exemplary embodiment, a financed aircraft is considered the same as a mortgaged aircraft. For example, a lessor name may be associated with each of the leased aircraft. Each of the leased aircraft may be required to be returned to the lessor on a return date based on a lease return ("L/R") condition. In an exemplary embodiment, each of the leased aircraft may have one or more L/R conditions, which are any contractual requirements related to the leased aircraft. In an exemplary embodiment, a L/R event, such as a repair cost, a buy-up cost, or a buy-out cost may be incurred near the return date if an engine does not satisfy any of one the L/R conditions. However, a leased aircraft may remain within the aircraft fleet past the return date (the leased aircraft is not returned to the lessor on or before the return date) if a lease renewal cost is paid to the lessor and if there is an extended lease return option associated that leased aircraft's contract. In an exemplary embodiment, the extended lease return option involves a minimum renewal period and an incremental renewal period. In an exemplary embodiment, the incremental renewal period is a month. Additionally, each leased aircraft may have a monthly lease rate associated with a renewal period of less than one year, a monthly lease rate associated with a renewal period between 1 and 3 years, and a monthly lease rate associated with a renewal period of more than three years. A leased aircraft may be returned to the lessor prior to the return date if an early return cost is paid to the lessor and if there is an early lease return option associated that leased aircraft's contract. A mortgaged aircraft may have a mortgage contract early termination cost ("MCETC") that is associated with terminating a mortgage at any time prior to a mortgage end date. Similarly, a financed aircraft may have a finance contract early termination cost ("FCETC") that is associated with terminating a finance agreement at any time prior to a finance end date. The aircraft contract data may also include a forced retirement date, which is the date on which the aircraft is no longer used ("retired"); an earliest retirement date, which is the earliest date on which an aircraft may be retired; and maximum aircraft age for each of the aircraft. In an exemplary embodiment, the forced retirement date is independent from: the minimum renewal period; the incremental renewal period; and the earliest retirement date. The aircraft fleet plan data includes the number of aircraft that comprise the aircraft fleet at a time period and a budget amount associated with that time period. In an exemplary embodiment, the budget amount may be expressed in a value per time period (e.g., annual budget). In an exemplary embodiment, the aircraft dock plan data includes aircraft maintenance plan data. In an exemplary embodiment, the aircraft maintenance plan data includes types of maintenance activities that each aircraft requires, a due date for each type of maintenance activity for each aircraft, and a start date for type of maintenance activity for each aircraft. Types of maintenance activities includes a light check ("LC"), a heavy check ("HC"), a mid-check ("MC") that has a scope of work between the LC and HC, a main base visit ("MBV"), which is a HC for a wide body aircraft (e.g., Boeing 777 or 767) and special shop visits and MOD (modification work). Additionally, a MBV is associated with a MBV number, days between MBV ("MBV days"), and a MBV yield (expressed in a percentage and relating to how soon a MBV is required). HC is associated with a HC number, days between HC ("HC days"), and a HC yield (expressed in a percentage and relating to how soon a HC is required). LC is associated with a LC number, days between LC ("LC days"), and a LC yield (expressed in a percentage and relating to how soon a LC is required). For example, if an aircraft has a LC yield of 0% then LC is imminent but if the LC yield is 100%, then LC has just been performed. In an exemplary embodiment, the yield (i.e., MBV yield, HC yield, LC yield) associated with an aircraft is indicative of how quickly a maintenance activity is required. In an exemplary embodiment, one or more of the L/R conditions relates to the yield associated with an aircraft. In an exemplary embodiment, the aircraft cost data includes aircraft dock line costs, which are costs relating to each type of type of maintenance activity. In an exemplary embodiment, each of the aircraft dock line costs is accrued on the due date of each type of maintenance associated with the dock line cost. In an exemplary embodiment, the aircraft data may include data from fleet operations, such as for example, a number of aircraft that should have an active status for each time period.

Figure 4:
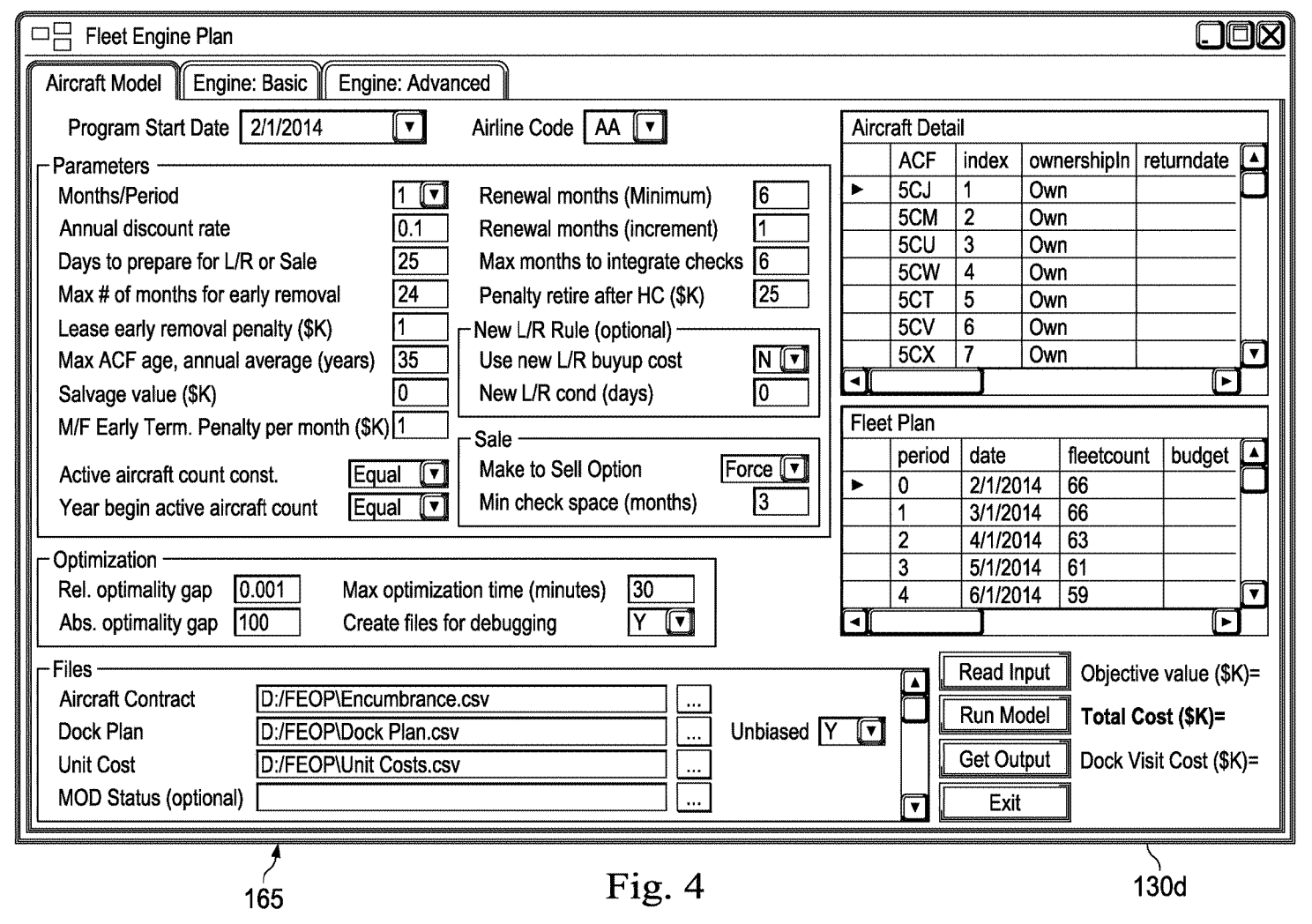

In an exemplary embodiment, the system 10 receives the program parameters using the remote user device 130 at the step 150. In an exemplary embodiment and as shown in FIG. 4, the program parameters, or model parameters, may be received via the output device 130d using a screen display 165. In an exemplary embodiment, the program parameters may be received via drop down menus, text fields, etc. In an exemplary embodiment, the program parameters include a program start date, a months per time period input, an annual discount rate, a number of days to prepare for a L/R or sale, a maximum number of months for early removal, a lease early removal penalty amount, a maximum aircraft age in annual average years, a salvage value of an aircraft amount, the MCETC per month amount or the FCETC per month amount, the active aircraft count constraint, the year beginning the active aircraft count, a minimum renewal term in months, an increment renewal term in months, the maximum months to integrate checks (or maintenance activities), a penalty amount associated with retiring an aircraft after HC, whether to use "new" L/R buy-up costs, a new L/R condition in days, a "make to sell" option, and a minimum check space in months. In an exemplary embodiment, the program start date is a start date of a planning period T. In an exemplary embodiment, the planning period starts at a time period P0 and has an end date of time period PT. In an exemplary embodiment, the program start date will be rounded to the beginning of a closest time period between P0 and PT. In an exemplary embodiment, the months per time period input controls how many months are included in a time period. In an exemplary embodiment, the annual discount rate is an effective annual discount rate. That is, the annual discount rate calculates the value of cash at a future date. In an exemplary embodiment, the number of days to prepare for a L/R or sale may vary, but the system 10 uses a default of 60 days. In an exemplary embodiment, the maximum number of months for early removal may vary, but the system 10 uses a default of thirty-six months. In an exemplary embodiment, the maximum number of months for early removal is applicable to leased aircraft. In an exemplary embodiment, if a leased aircraft is removed from the aircraft fleet before the return date, a lease early removal penalty is applied. The lease early removal penalty is a variable cost and is assessed per time period. The system 10 uses a default value of $5,000 for the lease early removal penalty. In an exemplary embodiment, the lease early removal penalty is related to storage costs of the leased aircraft that is removed from the aircraft fleet prior to the return date. In an exemplary embodiment, the average age of all active aircraft of a given year should be equal to or less than the maximum aircraft age in annual average years. In an exemplary embodiment, the maximum aircraft age in annual average years is variable. In an exemplary embodiment, the salvage value is the value of an owned aircraft, a mortgaged aircraft, or a finance aircraft upon retirement. In an exemplary embodiment, the salvage value can be either a negative amount or a positive amount. In an exemplary embodiment, the system 10 uses a default salvage value of $100,000. In an exemplary embodiment, the MCETC or FCETC per month amount is a penalty amount associated with terminating a mortgage or finance agreement before the mortgage end date or the financed end date. In an exemplary embodiment, the active aircraft count constraint may be variable and include options of "equal", "at most", or "at least." In an exemplary embodiment, the year beginning the active aircraft count may be variable and include options of "equal", "at most" or "at least." In an exemplary embodiment, the minimum renewal months is the minimum amount of time associated with an initial lease extension. In an exemplary embodiment, the increment renewal months is an amount of time associated with a lease extension after the initial lease extension. In an exemplary embodiment, the maximum months to integrate checks relates to integrating a more thorough check, such as a HC, with a less thorough check, such as a LC, when a less thorough check is due in order to reduce the dock line costs. In an exemplary embodiment, the maximum months to integrate checks provides a maximum amount of time in which two individual checks can be spaced before the two individual checks can be integrated into one check. In an exemplary embodiment, the penalty to retire after HC relates to imposing a penalty if an aircraft is retired while at extreme yield (e.g., at 0% or 100%). In an exemplary embodiment, there are two options relating to calculating a L/R cost: a new L/R buy-up rule and an old L/R cost rule. If the old L/R cost rule is used and if an aircraft does not meet one of the L/R conditions, then the buy-out cost is incurred. If the new L/R cost rule is used and if an aircraft exceeds one of the L/R conditions, then the buy-up cost is incurred and if the aircraft does not meet one of the L/R conditions, then a constant cost is incurred.

In an exemplary embodiment, the system 10 generates the optimal aircraft fleet solution at the step 155. In an exemplary embodiment, the optimal aircraft fleet solution provides an order in which the aircraft 40, 55, 70, 85, 100, and 115 should retire, sorted by date. In an exemplary embodiment, the optimal aircraft fleet solution provides a summary that totals costs relating to the maintenance of the aircraft 40, 55, 70, 85, 100, and 115 for each time period within the planning period and/or for the entire planning period. In an exemplary embodiment, the optimal aircraft fleet solution provides a summary that totals the dock line costs associated with each of the aircraft 40, 55, 70, 85, 100, and 115. In an exemplary embodiment, the optimal aircraft fleet solution provides a summary that totals the costs associated with the L/R events. In an exemplary embodiment, the optimal aircraft fleet solution considers the contract related data and conditions and associated costs, such as for example the L/R costs, the MCETC, the FCETC, the lease renewal cost, etc. In an exemplary embodiment, generating the optimal aircraft fleet solution includes sub-steps of creating a node for each aircraft within the aircraft fleet at step 155a, creating arcs between the nodes at step 155b, and simultaneously generating an optimal single-aircraft solution, using the arcs, for each aircraft within the aircraft fleet at the step 155*c*.

Figure 5:
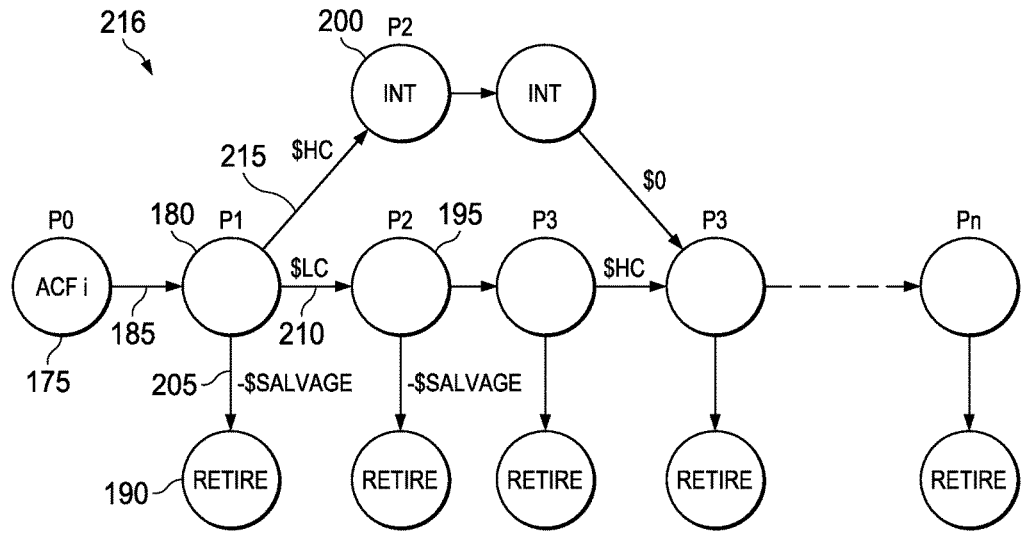
FIG. 5 is a diagrammatic illustration of an optimization network, according to an exemplary embodiment.

In an exemplary embodiment, the system 10 creates nodes for each aircraft within the aircraft fleet at the step 155*a*. In an exemplary embodiment, a possible state of each aircraft at each time period during the planning period T is represented by a node. That is, each aircraft will be represented by multiple nodes within the time periods that comprise the planning period T. For example and as show in FIG. 5, an owned aircraft i "ACF i" at a time period P0 is represented by a node 175. The same aircraft i will have additional nodes associated with the time periods P1, P2, P3 . . . Pn. A state of each aircraft includes a time period, the yield (i.e., MBV yield, HC yield, LC yield) of the aircraft, one of the L/R conditions associated with the aircraft (if a leased aircraft), the aircraft age, etc. However, the state of an aircraft can include any aircraft date.

Figure 6:
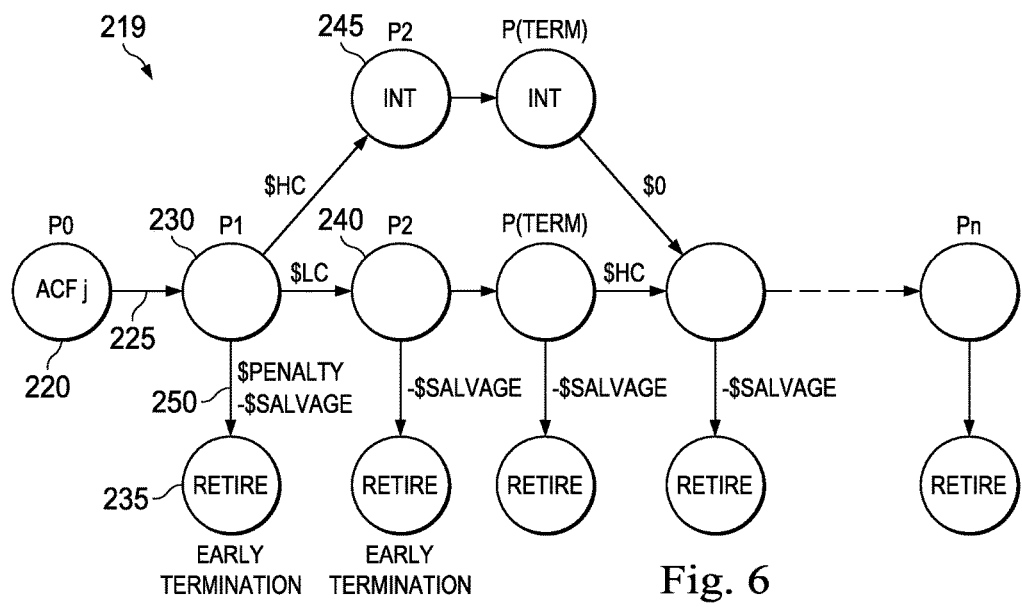
FIG. 6 is a diagrammatic illustration of another optimization network, according to an exemplary embodiment.
Figure 7:
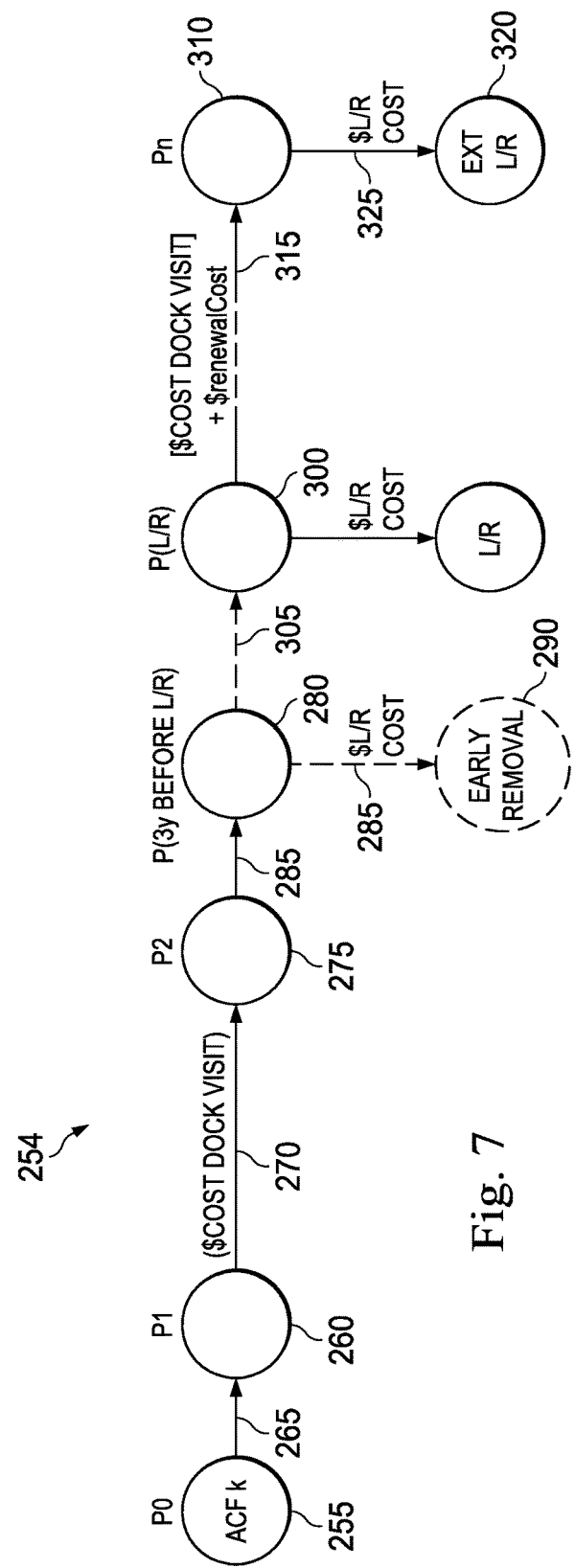
FIG. 7 is a diagrammatic illustration of yet another optimization network, according to an exemplary embodiment.

In an exemplary embodiment, the system 10 creates arcs between the nodes at the step 155*b*. In an exemplary embodiment, an arc, or a relationship identifier, from one aircraft node to another aircraft node represents a possible change in state. In an exemplary embodiment, an arc defines a relationship between two nodes from the plurality of nodes. A value on the arc represents the cost associated with changing a state associated with one node to another state associated with another node. In an exemplary embodiment, the value of the arc may be zero. For example, as MBV, HC, and LC are not required at the time period P1, no costs are associated with the aircraft i as it passes from the time period P0 (the node 175) to a time period P1, which is represented by a node 180. Therefore, an arc 185 that extends from the node 175 and towards the 180 does not have a value. At the time period P2, a LC is required. At the time period P1, there are three states relating to aircraft i that could extend from the node 180: the aircraft i could be retired, as represented by a node 190, the aircraft i could undergo LC, as represented by node 195, or the aircraft i could undergo HC, as represented by node 200. An arc 205 extends from the node 180 and to the node 190 representing the change in state to "retired" and having a salvage value of the aircraft i. The salvage value is the value of the aircraft i when it is retired. It can be a positive or negative value. An arc 210 extends from the node 180 and to the node 195 representing a change in time to P2 and having the dock line cost associated with the LC. An arc 215 extends from the node 180 and to the node 200 representing a change in time to P2 and having the dock line cost associated with the HC. The arc 215 represents performing HC at the time that LC is due to integrate the LC and HC together. A series of arcs and nodes are created for the aircraft i until the time period Pn, which is associated with the forced retirement date of the aircraft i. A series of arcs (e.g., 185, 205, 210, 215) and nodes (e.g., 175, 180, 190, and 200) are generated for the aircraft i until the time period Pn, and together form an optimization network 216. The series of arcs and nodes can be combined to generate a single-aircraft solution for aircraft i. Depending on the number of arcs and nodes, multiple single-aircraft solutions may be generated using the optimization network 216. Similarly and as shown in FIG. 6, an mortgaged aircraft j has an optimization network 219. The mortgaged aircraft j is represented by a node 220 at a time period P0. For this example, the aircraft j has a mortgage end date at the time period subsequent P2, at P(term), and a required LC due at the time period P2. An arc 225 extends from the node 220 to a node 230 that is associated with a time period P1. As MBV, HC, and LC are not required at the time period P1, no value is associated with the arc 225. At the time period P2, a LC is required. At the time period P1, there are three states relating to aircraft j that could extend from the node 230: the aircraft j could be retired, as represented by a node 235, the aircraft j could undergo LC, as represented by node 240, or the aircraft j could undergo HC, as represented by node 245. An arc 250 extends from the node 225 to the node 235 to represent a change in state to "retired" and having a value of the difference between a salvage value of the aircraft j and the MCETC. A series of arcs and nodes are generated for the aircraft j until the time period Pn, which is associated with a forced retirement date. Once the time period is P(term), the aircraft j may be retired without a penalty. The series of arcs and nodes can be combined to generate a single-aircraft solution for aircraft j. Depending on the number of arcs and nodes, multiple single-aircraft solutions may be generated using the optimization network 219. As shown in FIG. 7, a leased aircraft k is associated with an optimization network 254. The aircraft k is represented by a node 255 at a time period P0. For this example, the aircraft k has a lease contract with an early lease return option associated with a time period P(3y before L/R), and an L/R condition associated with a time period P(L/R). As MBV, HC, and LC are not required at the time period P1, which is represented by a node 260, no value is associated with an arc 265 that extends from the node 255 to the node 260. At the time period P2, a MBV, HC, or LC is required. An arc 270 extends between the node 260 and a node 275 that represents the aircraft k at the time period P2. The value of the arc 270 is the cost associated with the dock line costs associated with the MBV, HC, or LC. At the time period P(3y before L/R), which is associated with a time period three years before the lease return date, the aircraft k is represented by a node 280. No dock lines costs are required at the time period P(3y before L/R), therefore no value is associated with an arc 285 that extends from the node 275 and to the node 280. At the time period P(3y before L/R), the aircraft k may be removed early, which is represented by a node 290. An arc 295 extends from the node 280 and to the node 290 to represent the possibility of the aircraft k being removed early. The arc 295 has a value associated with the L/R cost, which depends upon multiple factors and conditions. The aircraft k may also continue to be active, or remain in the aircraft fleet, until the time period P(L/R), at which the aircraft k may be returned without paying the early return cost and is represented by a node 300. In an exemplary embodiment, an inactive aircraft is an aircraft that is not active. An arc 305 extends from the node 280 and to the node 300 to represent the possibility of the aircraft k continuing to be active until the time period P(L/R). The aircraft k may continue to remain active until the time period Pn as represented by a node 310, which is past the time period that encompasses the return date. An arc 315 extends from the node 300 and to the node 310 and has a value associated with the lease renewal cost and any required cost dock visits incurred between the time period P(L/R) and the time period Pn. At the time period Pn, the aircraft k is returned after the lease termination date and is represented by a node 320. An arc 325 extends from the node 310 and to the node 320 and has a value associated with any L/R costs. The arcs 265, 270, 285, 295, 205, and 315 and the nodes 255, 260, 275, 280, 300, 310 and 320 can be combined to generate a single-aircraft solution for aircraft k. Depending on the number of arcs and nodes, multiple single-aircraft solutions may be generated using the optimization network 254.

In an exemplary embodiment, the system 10 simultaneously generates an optimal single-aircraft solution, using the arcs and the nodes within the optimization networks 216, 219, and 254, for each aircraft within the fleet at the step 155c. In an exemplary embodiment, the system 10 creates an aircraft optimization network using the arcs and the nodes. In an exemplary embodiment, the system 10 executes an aircraft optimization model using the aircraft optimization network to consider all possible changes in state for each aircraft and to simultaneously determine the optimal single-aircraft solution for each of the aircrafts within the aircraft fleet. Combining the optimal single-aircraft solutions results in the optimal aircraft fleet solution. In an exemplary embodiment, the optimal aircraft fleet solution is a combination of schedules and summaries. In an exemplary embodiment, the aircraft optimization model uses a mixed-integer program formulation to determine the optimal aircraft fleet solution. In an exemplary embodiment, the mixed-integer program can be mathematically written as follows:
Minimize:

$$\sum_i \sum_j c(i,j) * useArc(i,j) +$$

$$\sum_{arc(i,j) \in retireArc} [penalty_{EearlyTerm(i,j)} - salvage(i,j) + artCost(i,j)] *$$

$$retireArc(i,j) + \sum_{arc(i,j) \in EarlyRemovalArc} (L/RCost_{(i,j)} + artCost(i,j)) *$$

$$earlyRemovalArc(i,j) +$$

$$\sum_{arc(i,j) \in LeaseExtendArc} (L/RCost_{(i,j)} + + artCost(i,j)) * leaseExtendArc(i,j)$$

Subject to: (1)

useArcuseArc(i,0)+retireArc(i,0)=1   (2)

useArc(i,j)=useArc(i,j+1)+retireArc(i,j+1) ∀i,∀j=1, max period−1   (3)

$\Sigma_i$ useArc(i,j)=(or ≥,≤)fleet count ∀j   (4)

$\Sigma_{i,j \in y}(i,j)$*useArc(i,j)≤annual budget(y) ∀year y with budget limit   (5)

$\Sigma_{i,j \in y}$useArc(i,j)*[Age(i,j)−Max ACFAgeLimit]≤0 ∀year y   (6)

Where:
c(I,j)=dock cost of aircraft I at period j+renewal cost (if applicable)
arcCost(i,j)=yield penalty*(% of remaining yield)*+AgePenalty
Age(i,j)=age of aircraft I at period j In an exemplary embodiment, the objective of function (1) is to minimize costs associated with the aircraft fleet. Constraint set (2) ensures the number of arcs leaving a source node (a node associated with the time P0) is one. Constraint set (3) ensures that the number of arcs leaving a non-sink node (a retire node, a return node, and an early removal node) equals to the number of arcs entering the node. Constraint set (4) is an aircraft fleet plan constraint that ensures that the number of the aircraft comprising the fleet is equal to, at most, or at least (as determined by the program parameters) the active aircraft count constraint. Constraint set (5) ensures that the sum of the dock line costs is less than or equal to the budget amount. Constraint set (6) ensures that the average age of all active aircraft of a given year is equal to or less than the maximum aircraft age in annual average years.

In an exemplary embodiment and as shown in FIG. 8, the system 10 displays a portion of the optimal aircraft fleet solution on the remote user device 130. A portion of the optimal aircraft fleet solution is displayed using a screen display 340. In an exemplary embodiment, the optimal aircraft fleet solution provides a summary of all maintenance activities that will be completed by month. In an exemplary embodiment, the optimal aircraft fleet solution provides a detailed expected dock line cost, by aircraft, by maintenance activity, by month, and/or differentiates actual maintenance activities from L/R events, such as a repair cost, a buy-up cost, or a buy-out cost. In an exemplary embodiment, the optimal aircraft fleet solution provides a summary of cost details (i.e., monthly lease renewal cost, penalty of early lease removal, penalty of contract termination, and L/R costs) and the specific tail number retirement order and action at each month. In an exemplary embodiment, the optimal aircraft fleet solution creates a retirement and maintenance plan that is within the budget amount. In an exemplary embodiment, the optimal aircraft fleet solution creates a maintenance schedule for each of the aircraft over the planning period to satisfy the L/R conditions associated with a leased aircraft or to not satisfy the L/R conditions associated with the leased aircraft.

In an exemplary embodiment, the method 140 may be used to provide an order in which the aircraft 40, 55, 70, 85, 100, and 115 should retire, the order sorted by date. In an exemplary embodiment, the method 140 may be used to sum costs relating to the maintenance of the aircraft 40, 55, 70, 85, 100, and 115 for each time period within the planning period and/or for the planning period. In an exemplary embodiment, the method 140 may be used to total costs relating to the maintenance of each of the aircraft 40, 55, 70, 85, 100, and 115. In an exemplary embodiment, the method 140 may be used to total the costs associated with the L/R events for each time period within the planning period and/or the planning period. In an exemplary embodiment, the method 140 may be used to provide cost details (i.e., monthly lease renewal cost, penalty of early lease removal, penalty of contract termination, and L/R costs). In an exemplary embodiment, the method 140 may be used to minimize dock lines costs. In an exemplary embodiment, the method 140 may be used to cost effectively prepare for a L/R of each aircraft. In an exemplary embodiment, the method 140 may be used to schedule maintenance activities for each of the aircraft over the planning period so that the budget amount is not exceed for each of the time period within the planning period. In an exemplary embodiment, the method 140 may be used to choose which maintenance activities to perform for each of the aircraft over the planning period. In an exemplary embodiment, the method 140 may be used to effectively utilize opportunities to integrate maintenance activities (checks). In an exemplary embodiment, the method 140 may be used to determine when to retire an owned aircraft. In an exemplary embodiment, the method 140 may be used to schedule premature HC visits to avoid exceeding the budget amount. In an exemplary embodiment, the method 140 may be used to effectively manage mortgaged and financed aircraft to avoid HC costs. In an exemplary embodiment, the method 140 may be used to minimize the dock line costs for the aircraft fleet through the planning period T. In an exemplary embodiment, the optimal aircraft fleet solution ensures that a number of aircraft having an active status is equal to, at most, or at least the number of active aircraft required by the program parameters or by fleet operations. In an exemplary embodiment, the optimal aircraft fleet solution totals dock line costs of the aircraft fleet through the planning period T. In an exemplary embodiment, the method 140 may be used to maximize revenue generating activities, such as for example retiring an aircraft at a time period that corresponds with a maximum salvage value. In an exemplary embodiment, the method 140 may be used to determine an aircraft deposition schedule that includes a schedule of when to retire aircraft within the plurality of aircraft and when to return a leased aircraft (either on the return date or after a lease extension) and in what condition to return a leased aircraft. In an exemplary embodiment, the deposition schedule assigns a period of time to retire an aircraft that has an age that exceeds the maximum aircraft age. In an exemplary embodiment, the deposition schedule assigns a period of time to retire an aircraft that has an age that exceeds the maximum aircraft age in order to ensure that the average age of all active aircraft of a given year is equal to or less than the maximum aircraft age in annual average years.

Figure 9:
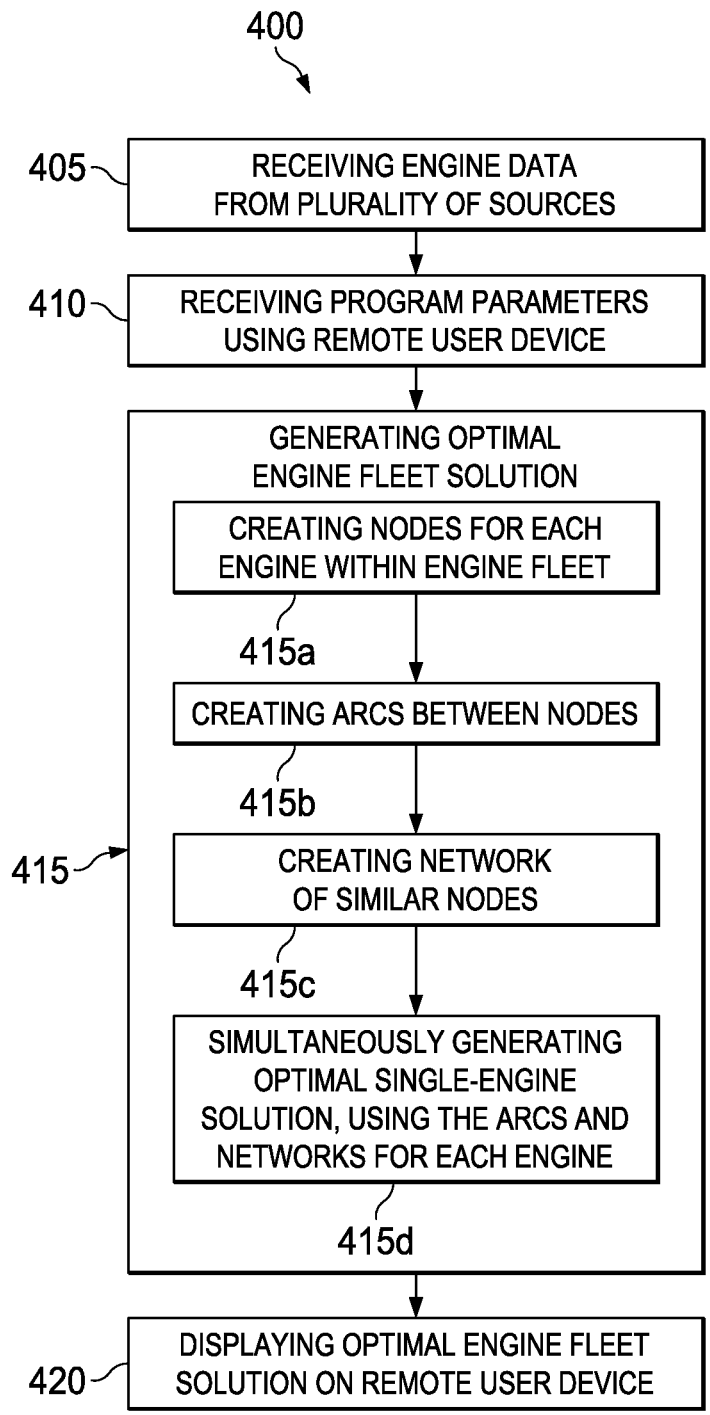
FIG. 9 is a flow chart illustration of another method of operating the system of FIG. 1, according to an exemplary embodiment.

In an exemplary embodiment, as illustrated in FIG. 9 with continuing reference to FIGS. 1-8, a method of generating an optimal engine fleet management solution, or an optimal engine fleet solution, by operating the system 10, is generally referred to by the reference numeral 400. In one embodiment, the method 400 includes receiving the engine data from the plurality of data sources 30 at step 405, receiving the program parameters using the remote user device 130 at step 410, generating the optimal engine fleet solution at step 415, and displaying the optimal engine fleet solution on the remote user device 130 at step 420.

In an exemplary embodiment, the system 10 receives the engine data from the plurality of data sources 30 at the step 405. In an exemplary embodiment, the engine data includes engine contract data, engine fleet plan data, engine dock plan data, engine status data, and engine condition data. The engine contract data includes an engine identification number, a manufactured date, and an ownership status. The ownership status is any one of "owned," "mortgaged," "financed," and "leased", which is associated with an "owned engine," a "mortgaged engine," a "financed engine," and a "leased engine," respectively. In an exemplary embodiment, a financed engine is considered the same as a mortgaged engine. The engine contract data also includes contract related data and conditions that are associated with each leased engine, financed engine, and mortgaged engine. For example, a lessor name may be associated with each of the leased engines. Each of the leased engines may be required to be returned to the lessor on a return date in a required lease return condition. For example, a leased engine may be required to be returned to the lessor with one or more L/R conditions satisfied on the return date. In an exemplary embodiment, a life limited part ("LLP") return condition is one of the L/R conditions. The LLP return condition relates to a remaining engine life value ("RELV") in remaining hours, cycles, and/or percentages for an individual engine and/or for combined engines in a pair. If the RELV is greater than zero, the engine has "remaining life." Generally, the RELV is defined in cycles that remain until the next maintenance activity, which increases the RELV of an engine, is required. The leased engine should be returned to a lessor having a minimum RELV. In an exemplary embodiment, the minimum RELV is one of the L/R conditions. In an exemplary embodiment, the contract data also includes a mean time between major refurbishments ("MTBMR") return condition. In an exemplary embodiment, the MTBMR return condition is one of the L/R conditions. In an exemplary embodiment, if the RELV does not meet or exceed the LLP return condition (and/or the MTBMR return condition) but meets or exceeds a minimum buy-out condition, then the leased engine may be returned to the lessor if a monetary penalty is paid. In an exemplary embodiment, the minimum buy-out condition is one of the L/R conditions. This monetary penalty is often referred to as a "buy-out cost." If the RELV does not meet or exceed the minimum buy-out condition, then the leased engine may not be able to be returned to the lessor. Instead, the leased engine may be "swapped" with an owned engine that meets or exceeds the minimum buy-out condition or that meets or exceeds the LLP return condition. That is, an owned engine is returned to the lessor in place of the leased engine. Alternatively, the leased engine may be altered or repaired to meet the LLP return condition. For example, the leased engine may be repaired so that the RELV is increased to meet the LLP return condition. An owned engine has no contractual requirements or conditions. A mortgaged engine may have a contract requirement that applies to the mortgaged engine prior to an end of the mortgage term as specified in the mortgage contract. In an exemplary embodiment, a contractual requirement may prevent the mortgaged engine from being parked or retired prior to the mortgage end date. That is, a mortgaged engine must be an "active" engine. In an exemplary embodiment, a contractual requirement may require specific maintenance activities to be performed at certain time periods. In an exemplary embodiment, a mortgaged aircraft may also have a contractual requirement that allows for the engine to be swapped with an owned engine. A financed aircraft may also have a contract requirement that prevents the financed engine from being parked or retired prior to a finance end date. That is, a financed aircraft must be an "active" engine. In an exemplary embodiment, a financed aircraft may also have a contractual requirement that prevents the financed engine from being swapped with an owned engine. The engine fleet plan data includes the number of engines that comprise the engine fleet at a time period between t and T, encompass a planning period T. The engine fleet plan data also includes a budget amount that is associated with each time period, the planning period, and/or any time period (e.g., annual budget). In an exemplary embodiment, the budget amount is associated with a time period t or per year. In an exemplary embodiment, the engine dock plan data includes engine maintenance plan data. In an exemplary embodiment, the engine maintenance plan data includes planned types of maintenance for each engine, a due date for each type of maintenance for each engine, and a start date for each type of maintenance for each engine. In an exemplary embodiment, the engine maintenance plan data includes data relating to engine overhaul maintenance activities, such as for example data relating to engine heavy maintenance category 1 maintenance activities ("EHM1"), engine heavy maintenance category 2 maintenance activities ("EHM2"), periodical ground maintenance activities ("PGM"), and a mean time between major refurbishments ("MTBMR"), which is the time interval between any two of EHM1, EHM2, and PGM. The EHM1 includes performing scheduled maintenance work associated with a EHM1. A cost of the EHM1 is a weighted average and distributed over an engine's engine life. The cost of a EHM1 is slightly higher than the cost of PGM. In an exemplary embodiment, the EHM2 is a required when the RELV of an engine approaches zero. An EHM2 may also occur at a scheduled EHM1 or PGM visits if replacing LLP parts is deemed to result in future savings in the maintenance costs during a EHM1 or PGM. That is, whenever an engine has an EHM1 or PGM visit, the engine is said to have an "upgrade opportunity," which increases the RELV. A "premature EHM2" is when a EHM2 is performed before its "LLP time out," or prior the RELV reaching a value that is associated with prompting a EHM2 visit. In an exemplary embodiment, a "premature EHM2" is performed before an expected removal date. In an exemplary embodiment, a full EHM2 ("full build") increases the RELV to 100%. A "partial build" increases the RELV to a level of less than 100%. A cost associated with the EHM2 includes labor costs plus parts costs prorated by the level of build, regardless of the RELV at the time of visit. In an exemplary embodiment, the maintenance activities are scheduled to ensure that the budget amount is not exceeded for a specific time period. In an exemplary embodiment, the engine status data includes an active status, which relates to an active engine, and a parked status, which relates to a parked engine. In an exemplary embodiment, the active engine is an engine that is on an active aircraft, on a spare aircraft, in the field as a spare engine (as required by fleet operations), or having heavy maintenance performed or waiting to have heavy maintenance performed ("in the shop"). An active engine that is not having heavy maintenance performed or waiting to have heavy maintenance performed is also considered "in rotation" or "in use." An active engine may or may not have any remaining life. In an exemplary embodiment, an inactive engine is an engine that is not active. In an exemplary embodiment, the parked engine is an engine without any designated purpose and is part of an inactive engine. In an exemplary embodiment, an initially parked engine is an engine that is parked at the time period 0. The engine condition data includes data relating to the condition of the engine, such as whether the engine is serviceable or unserviceable. In an exemplary embodiment, an unserviceable engine requires a certain type of maintenance activity performed to become serviceable. In an exemplary embodiment, an unserviceable engine may or may not have any remaining life. An unserviceable engine may be either considered "active" or "parked." In an exemplary embodiment, a serviceable engine is not an unserviceable engine. In an exemplary embodiment, a serviceable engine is an engine that has remaining life and is available for use. The engine condition data also includes data relating to the RELV associated with each engine. The RELV associated with a time period relates to upcoming maintenance activities (i.e., EHM1, EHM2, PGM, and MTBMR). In an exemplary embodiment, the RELV is expressed in hours, cycles, or percentages. The RELV, when expressed in cycles, is defined as the number of cycles remaining until an engine's next EHM2 visit. In an exemplary embodiment, the engine condition is expressed as a percentage of the RELV that remains at the beginning of a specific time period. A new engine or an engine with a full EHM2 build has 100% of life. After each period in use, its life is decremented by $\delta$%. For example, if j is the RELV expressed in percentages then j=$\{100, 100-\delta, 100-2\delta, \ldots\}$, and if $\delta$=3, then j=$\{100, 97, 94, \ldots, 4,1\}$. In an exemplary embodiment, the engine data also includes an initial engine data that provides the state of each engine at the time period 0. The system 10 uses the initial engine data to estimate the RELV for the time periods between 0 and T. A certain percentage of the RELV will be consumed in each time period that an engine is in use. The RELV will not be consumed or reduced in each time period that an engine is parked. In an exemplary embodiment, an owned engine can be serviceable or unserviceable, active or parked. In an exemplary embodiment, a mortgaged engine will become an owned engine at the end of the mortgage term as specified in the mortgage contract. In an exemplary embodiment, a mortgaged engine must be an active engine at the time period 0. In an exemplary embodiment, a mortgaged engine will have the mortgage end date corresponding to the date at which it is no longer mortgaged. In an exemplary embodiment, an initially parked engine is considered an unserviceable engine. An engine-specific activation cost is associated with making the initially parked engine serviceable. In an exemplary embodiment, a leased engine must be serviceable or in the shop, and be returned to the lessor at the beginning of the return period. In an exemplary embodiment, a leased engine may be parked at any time before the time period T. In an exemplary embodiment, the engine data may include data from fleet operations, such as for example, a number of engines that should have an active status for each period, a minimum number of engines that should have the status of owned and serviceable, a number of engines that should have the status of retired for each period; and a number of engines that are in the field and are considered a spare engine.

Figure 10:
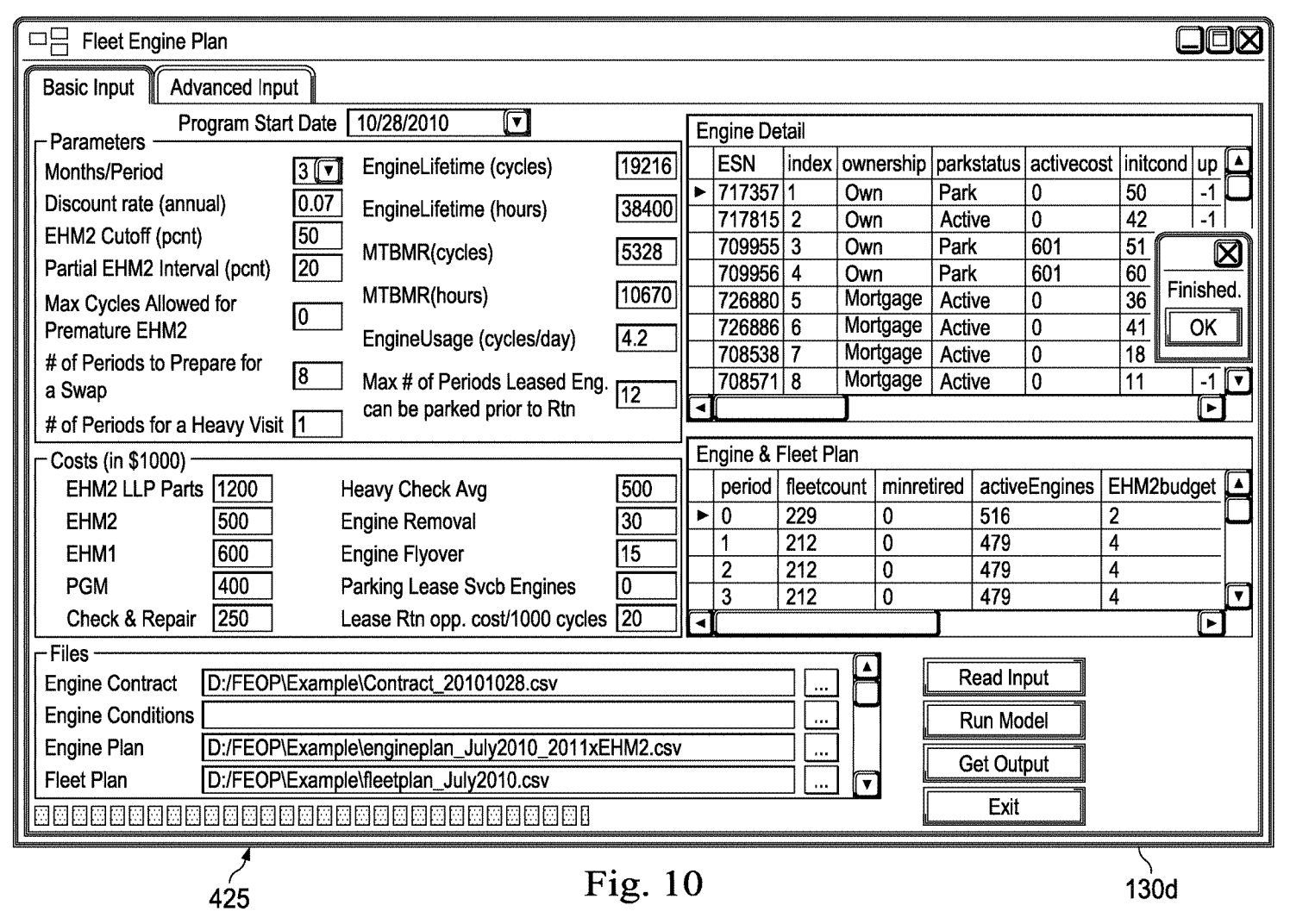

In an exemplary embodiment, the system 10 receives the program parameters using the remote user device 130 at the step 410. In an exemplary embodiment and as shown in FIG. 10, the program parameters may be received via the input device 130c using a screen display 425. In an exemplary embodiment, the program parameters may be received via drop down menus, text fields, etc. In an exemplary embodiment, the program parameters include the program start date, the months per time period input, the annual discount rate, an EHM2 cut-off percentage, a partial EHM2 interval percentage, a maximum number of cycles allowed for premature EHM2, a number of periods to prepare for a swap (i.e., returning an owned engine to the lessor instead of returning the leased engine), a number of periods for a heavy visit, an engine lifetime in cycles, an engine lifetime in hours, the MTBMR in cycles, the MTBMR in hours, an engine use in cycles per day, a maximum number of periods a leased engine can be parked prior to return, and multiple engine cost parameters amounts. The EHM2 cut-off percentage is used to determine an EHM2 build type (either a full build EHM2 or a partial build EHM2). A build having a percentage greater than the EHM2 cut-off percentage is considered to be a full build EHM2, which is included in a EHM2 budget. A build having a percentage that is less than the EHM2 cut-off percentage is considered only a partial build EHM2, which is not included in the EHM2 budget. The default EHM2 cut-off percentage is 50%. The partial EHM2 interval percentage is the percentage interval that an engine can be built to. For example, a partial EHM2 interval percentage of 20% means that an engine may be built to 20%, 40%, 60%, 80% and 100%. In an exemplary embodiment, the default partial EHM2 interval is 20%. In an exemplary embodiment, the number of periods to prepare for a swap is the "lead time" needed to prepare for a swap, with the default being 2. The number of periods for a heavy visit is the time needed to perform a heavy visit (either a EHM1 or PGM), with the default being 1. The engine lifetime in cycles is the LLP cycles, with the default being 19,216 cycles. The engine lifetime in hours is the total LLP hours, with the default being 38,400 hours. The engine usage in cycles per day is the average number of cycles "burned" per day, with the default being 4.2 cycles per day. In an exemplary embodiment, the maximum number of periods a leased engine can be parked prior to return is the maximum number of periods that a leased engine can be parked prior to its lease return, with the default being 99, which means the leased engine can be parked at any time. The multiple engine cost parameters, or the dock lines costs, or the engine shop costs, include: an EHM2 LLP Parts cost, which is the cost of parts to have a full EHM2; an EHM2 cost, which is the cost of non-LLP parts and labor to perform an EHM2; an EHM1 cost, which is the cost associated with parts and labor of having an EHM1; a program ("PGM") cost, which is the cost associated with parts and labor of having a PGM; a check and repair ("C&R") cost, which is the cost associated with parts and labor of having a C&R; and a HC cost, which is the cost associated with parts and labor of having a heavy visit (either a EHM1 or PGM) and which are equal to the average cost of EHM1 and PGM. The multiple engine cost parameters also include: the engine removal cost, which is the cost of removing an engine from an aircraft; an engine flyover cost, which is the cost associated with parts and labor of "flying over"; a parking lease "SVCB", which is the cost associated with continuing to park a leased, serviceable engine per time period; and a lease return opportunity cost, which is the opportunity cost of returning a leased engine with each 1,000 cycles. In an exemplary embodiment, if a leased engine has a RELV higher than required by one of the L/R conditions at the beginning of its return period, the opportunity cost will be applied to discourage any returns of leased engines having a RELV higher than required by one of the L/R conditions.

In an exemplary embodiment, the system 10 generates the optimal engine fleet solution at the step 415. In an exemplary embodiment, the optimal engine fleet solution ensures that a number of engines that have an active status is either equal to, at least, or at most the number of active engines required by the program parameters or by fleet operations. In an exemplary embodiment, the optimal engine fleet solution totals the engine shop costs associated with the engines 45, 50, 60, 65, 76, 80, 90, 95, 105, 110, 120 and 125 for each time period and/or for the planning period. In an exemplary embodiment, the optimal engine fleet solution totals costs relating to the maintenance of each of the engines 45, 50, 60, 65, 76, 80, 90, 95, 105, 110, 120 and 125 for each time period and/or for the planning period. In an exemplary embodiment, the optimal engine fleet solution totals the costs associated with the L/R events. In an exemplary embodiment, the optimal engine fleet solution provides a maintenance schedule for the engines 45, 50, 60, 65, 76, 80, 90, 95, 105, 110, 120 and 125 having engine shop costs less than or equal to the budget amount. In an exemplary embodiment, the optimal engine fleet solution ensures one or more of the L/R conditions are satisfied. In an exemplary embodiment, the optimal engine fleet solution recommends when to park serviceable engines, when to activate unserviceable engines, and when to upgrade the RELV of an engine. In an exemplary embodiment, the optimal engine fleet solution determines whether a leased aircraft should be returned having conditions that satisfy one or more of the L/R conditions or should be swapped with an owned engine. In an exemplary embodiment, the optimal engine fleet solution determines whether an owned engine should be swapped with a mortgaged engine to avoid having to perform maintenance activities related to the mortgaged engine. In an exemplary embodiment, generating the optimal engine fleet solution includes sub-steps of creating nodes for each engine within the engine fleet at step 415a, creating arcs between the nodes at step 415b, creating networks using the nodes at step 415c, and simultaneously generating an optimal single-engine solution, using the arcs and the networks, for each engine at step 415d.

In an exemplary embodiment, the system 10 creates nodes for each engine at the step 415a. In an exemplary embodiment, a state of the engine is represented by a node. That is, a node represents the ownership status of the engine, the return condition of the engine, the condition of the engine (relating to the engine data), and a time period. Each engine will be represented by multiple nodes over multiple time periods. In an exemplary embodiment, each of the nodes is defined by $N_{n,j,t}^{m}$ (defining the state of the engine) where:

N is an index for the node type, $\in$ {Reg, Swt, Rtn, Rtr};
M is an index for the network type, $m \in$ {OS, OP, OU, LS-k, LP-k, LU-k, MS-l},
$k \in$ {all Leased engine networks},
$l \in$ {all Mortgaged engine networks};
j is the engine condition,
$j \in$ {all feasible engine conditions}; and
t is an index of a time period; $t \in$ {0, 1, . . . , T,T+1}, where T is the planning horizon.

In an exemplary embodiment, the system 10 creates directional arcs between the nodes at step 415b. In an exemplary embodiment, a directional arc extending from one node and pointing towards another node represents a possible change in the state from the node $N_{n,j,t}^{m}$ to the node $N_{n',j',t'}^{m'}$ and is denoted by an arc $N_{n,j,t}^{m} N_{n',j',t'}^{m'}$. A value on the arc $N_{n,j,t}^{m} N_{n',j',t'}^{m'}$ represents the number of engines that share the possible change in state. For example, an arc $N_{Reg,20,0}^{OS} N_{REG,18,1}^{OS} = 2$ represents two owned and serviceable engines with an initial condition of 20% in use in period t=0 and having a life of 18% at the beginning of period t=1 (assuming that the engine burns $\delta$=2% of life in each period). An arc has a cost associated with it, which represents the cost for the possible change in the state of the engine.

TABLE 1

| Arcs | Network | Arc Type | Cost | Description |
|---|---|---|---|---|
| $N^{m}_{Reg,j,t} N^{m}_{Reg,j-\delta,t+1}$ | m = {OS, LS-k, MS-l} | Use | 0 | Engines at $N^{m}_{Reg,j,t}$ are in use |
| $N^{m}_{Reg,j,t} N^{m}_{Reg,j',t+1}$ j < j', no upgrade at t | m = {OS, LS-k, MS-l} | EHM2 | EHM2 labor + parts prorated according to j', with cash discount | Engines at $N^{m}_{Reg,j,t}$ are in shop for EHM2 |
| $N^{m}_{Reg,j,t} N^{m}_{Reg,j',t+1}$ j < j', upgrade at t | m = {OS, OU, LS-k, LU-k, MS-l} | Upgrade | Upgrade cost prorated according to j', with cash | Engines at $N^{m}_{Reg,j,t}$ are in shop for EHM2 |
| $N^{m}_{Reg,j,t} N^{m}_{Reg,j,t+1}$ | m = {OP, OU, LP-k, LU-k} | Park | Parking cost for Owned or Leased engines | Engines at $N^{m}_{Reg,j,t}$ are parked |
| $N^{m}_{Reg,j,t} N^{m'}_{Rtr,j',t}$ j' = 0 | m, m' = { (OS, OS), (OU, OS} | Retire | Retirement cost | Engines at $N^{m}_{Reg,j,t}$ are retired |

TABLE 1-continued

| Arcs | Network | Arc Type | Cost | Description |
|---|---|---|---|---|
| $N^m_{Reg,j,t} N^{m'}_{Reg,j,t}$ | m, m' = { (MS-l, OS) } | MortgageOwn | 0 | Mortgaged engines at $N^m_{Reg,j,t}$ become Owned engines |
| $N^m_{Reg,j,t} N^m_{Swt,j,t}$ | m = {LS-k} | LeaseSwitch | 0 | Engines at $N^m_{Reg,j,t}$ are possible for swapping with Owned engines |
| $N^m_{Reg,j,t} N^m_{Rtn,j}$r,t | m = {LS-k} | LeaseReturn | Return cost | Engines at $N^m_{n,j,t}$ are possible for return |
| $N^m_{Swt,j,t} N^m_{Rtn,j}$r,t | m = {LS-k} | SwitctReturn | 0 | Engines at $N^m_{Swt,j,t}$ are possible for return |
| $N^m_{Reg,j,t} N^{m'}_{Swt,j',t}$ j < j' | m = {OS}, m' = {LS-k} | OwnSwitch | Return cost | Engines at $N^m_{Reg,j,t}$ can be swapped with Leased engines for return |
| $N^m_{Swt,j,t}$ $N^{m'}_{Reg,j-\delta,t+2}$ | m = {LS-k}, m' = {OS} | SwitchOwn | 0 | Engines at $N^m_{Swt,j,t}$ are possible for swapping with Owned engines and are in use |
| $N^m_{Swt,j,t} N^{m'}_{Reg,j,t+1}$ | m = {LS-k}, m' = {OS} | SwitchParkown | Parking cost for Owned engines | Engines at $N^m_{Swt,j,t}$ are possible for swapping with Owned engines and then are parked |
| $N^m_{Reg,j,t} N^{m'}_{Reg,j,t}$ | m, m' = {OU-OS}, (LU-k, LS-k)} | InitparkownOwn InitparkleaseLease | Activation cost | Unserviceable engines at $N^m_{Reg,j,t}$ become serviceable |
| $N^m_{Reg,j,t} N^{m'}_{Reg,j,t}$ | m, m' = {(OS,OP), (LS-k, LP-k)} | OwnParkown LeaseParklease | Engine removal cost | Engines at $N^m_{Reg,j,t}$ are changed from active to parked |
| $N^m_{Reg,j,t} N^{m'}_{Reg,j,t}$ | m, m' = {(OP,OS), (LP-k, LS-k)} | ParkownOwn ParkleaseLease | 0 | Engines at $N^m_{Reg,j,t}$ are changed from parked to active |

Table 1 shows all feasible arcs and associated costs considered by the system 10, wherein:

δ Average engine life burned per time period, expressed in %

γ EHM2 build-to condition equal to or greater than which is considered in the EHM2 budget. A typical choice could be λ=50%.

i Index of engine, i∈{all engines} j Node condition, j∈{all feasible engine conditions} t Index of time period; t∈{0, 1, . . . , T, T+1}, where T is the planning horizon m Index for network type, m∈{OS, OP, OU, LS-k, LP-k, LU-k, MS-l}, k∈{all Leased engine networks}, l∈{all Mortgaged engine networks} n Index for node type, n∈{Reg, Swt, Rtn, Rtr}

$\gamma_i$ Initial condition of engine i $g_i$ Period when engine i has an upgrade opportunity $\tau_i$ Return period specified in the contract for engine i $u_i$ Return condition for engine i $v_i$ Minimum buy-out condition for engine i $c_i$ Cost of upgrading engine i from 0% to 100% in the period when it is given an upgrade opportunity $I^{OS}$ a set containing all Owned Serviceable engines in period 0

$I^{OU}$ a set containing all Owned Unserviceable engines in period 0

$I^{LS-k}$ a set containing all Leased Serviceable engines with same return period and condition (indexed by k) in period 0

$I^{LU-k}$ a set containing all Leased Unserviceable engines with same return period and condition (indexed by k) in period 0

$I^{MS-l}$ set containing all Mortgaged engines with same return period (indexed by l) in period 0

$\Phi_{n,j,t}^m$ a set containing all feasible nodes that precede node $N_{n,j,t}^m$ $\Omega_{n,j,t}^m$ a set containing all feasible nodes that succeed node $N_{n,j,t}^m$ $\alpha_j^m$ Number of engines with initial condition of j in network m, $\alpha_j^m = \|i \in I^m, \forall \gamma = \gamma_i\|$ $\beta_m$ Number of engines at the beginning of period 0 in network m, $\beta_m = \|i \in I^m\|$. All engines in network m have the same return period with the same return condition $\tau^m$ Return period specified in the contract for engines in network a, $\tau^m = \tau_i \forall i \in I^m$, m={LS-k, MS-l}

$u^m$ Return condition specified in the contract for engines in network m, $u^m = u_i \subseteq i \in I^m$, m={LS-k}

$u_{min}^m$ Minimum return condition specified in the contract for engines in network m, $u_{min}^m = \text{Min } \{v_i\} \forall i \in I^m$, m={LS-k}

$p_{j,t}^m$ Number of upgrade opportunities at condition j in period t in network m, $p_{j,t}^m = \|i \in I^m, \forall j = \gamma_i - \delta t, t = g_i\|$, ∀m={OS, MS-l, LS-k}, $p_{j,t}^m = \|i \in I^m, \forall j = \gamma_i, t = g_i\|$, ∀m= (OU, LU-k)

$G_j^m$={all feasible conditions that can be upgraded to from condition j in network m}. Suppose that we only consider a limited number of build-to conditions for EHM2, say, 100%, 80%, 60%, 40%, and 20%. Then $G_{50}^m$={100, 80, 60}, $G_{20}^m$=(100, 80, 60, 40).

$A_t$ The number of engines that are active as required by fleet operations in period t $R_t$ Minimum number of engines that belong to network m={OS} and must be retired in period t as requirement by fleet operations.

$E_t$ The maximum number of EHM2 with build-to condition equal to or greater than X % in period t that can be allowed by EHM2 budget for that period $E_y$ The number of EHM2 with build-to condition equal to or greater than k % in year y that can be allowed by EHM2 budget for that year $N_{n,j,t}^m$ Node is defined by the node type n, condition j, and time period t in network m, where n={Reg, Swt, Rtn, Rtr}

$N_{n,j,t}^m N_{n',j',t'}^{m'}$ Arc defined by its from-node $N_{n,j,t}^a$ and to-node $N_{n',j',t'}^{m'}$. It is a decision variable and can only take an integer value.

$c_{n,j,t-n',j',t'}^{m-m'}$ Cost associated with arc $N_{n,j,t}^m N_{n',j',t'}^{m'}$ is determined by m, n, j, m',n' and j'.

In an exemplary embodiment, the upgrade cost and an activation cost are input to the system 10 and are specific to each engine. In an exemplary embodiment, a retirement cost is applicable to owned engines, where the retirement cost for an unserviceable engine is zero and where the retirement cost for a serviceable engine is an engine salvage value. In an exemplary embodiment, the engine salvage value is negative (as cost is treated as positive) equal to base value ($s_0$) plus an additional value for each percentage of life remaining ($s_1$). That is, salvageValue=$-(s_0+s_1+j)$. In an exemplary embodiment, the system 10 alters the salvage value as a function of the number of engines that are retired. In an exemplary embodiment, an engine return cost is applicable to leased engines only. The LLP return condition required by an engine contract is denoted by $j_r$. The engine return cost is discounted by a cash discount factor, which consists of three parts. First, a "LLP related opportunity" or the "buy-out cost", which is proportional to whether the engine RELV is above or below the LLP return condition, is equal to $|j-j_r|$ multiplied by a cost of each percentage of life remaining ($s_1$). Second, a MTBMR related buy-out cost, which is equal to the smaller of a general repair cost or a cost of repairing the engine to the MTBMR return condition. Third, the engine removal cost, which is the cost of removing the leased engine so that it can be swapped with an owned engine if swapping is needed.

Figure 11:
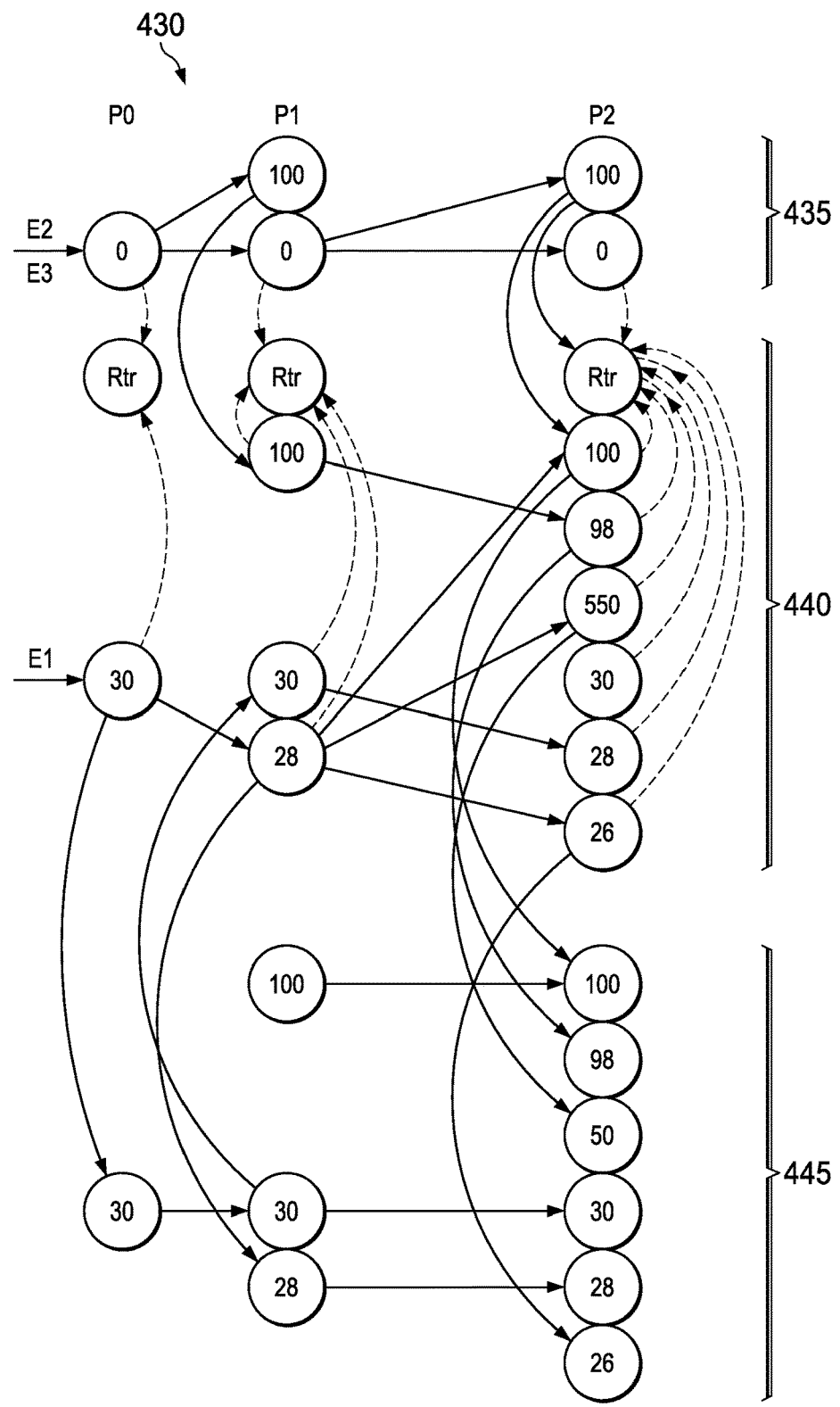
FIG. 11 is a diagrammatic illustration of an optimization network, according to an exemplary embodiment.
Figure 12:
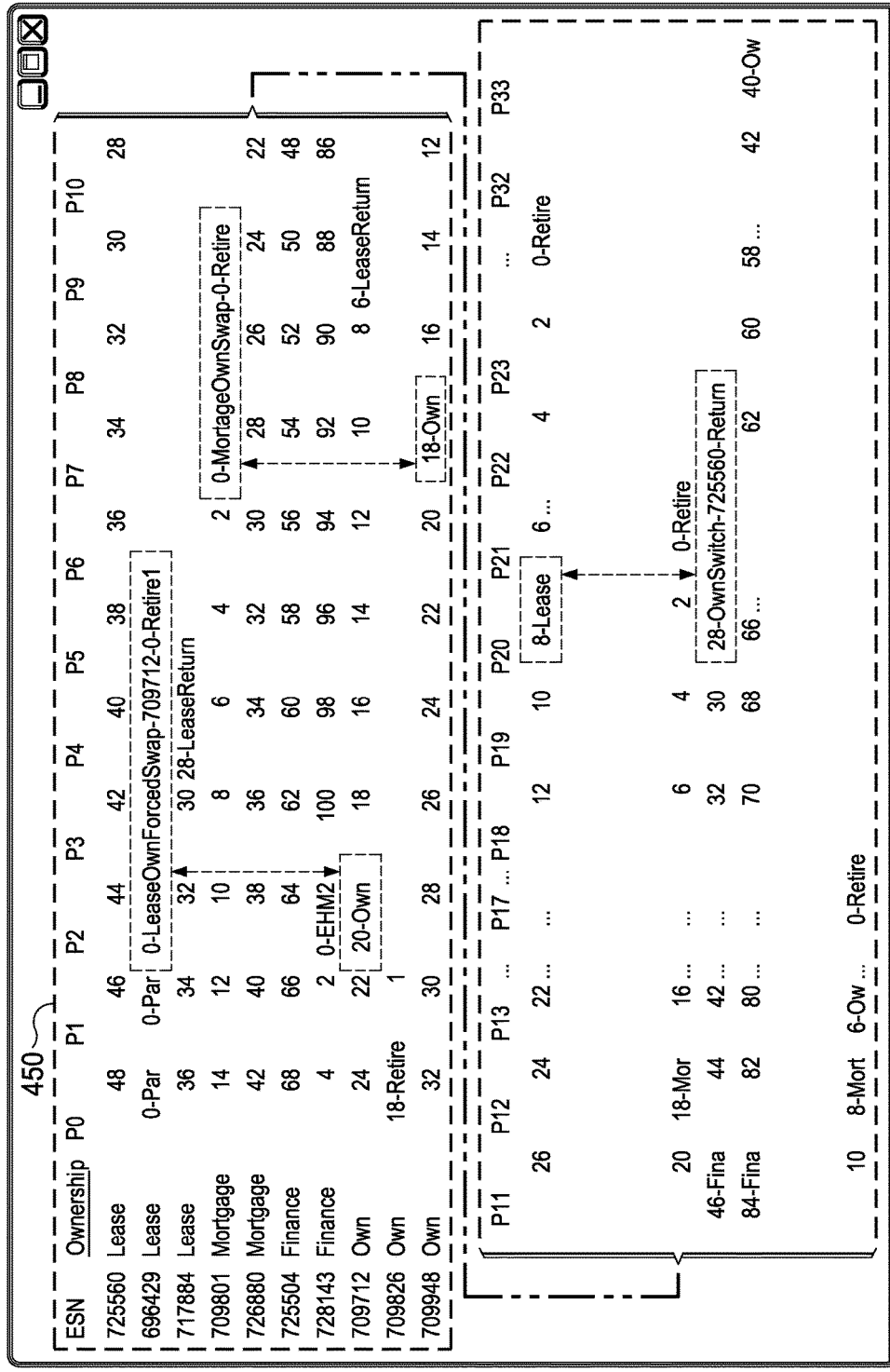
FIG. 12 is a diagrammatic illustration of the output device of FIG. 2 during the execution of another step of the method of FIG. 9, according to an exemplary embodiment.

In an exemplary embodiment, the system 10 creates networks of similar nodes at the step 415c. The nodes are grouped into a network type that share a status of the engine and/or a condition of the engine. For example, a network type may include engines being owned and serviceable ("OS"); engines being owned and parked ("OP"); engines being owned and unserviceable ("OU"); engines being leased and serviceable that are indexed by k ("LS-k"); engines being leased and parked indexed by k ("LP-k"); engines being leased and unserviceable at the beginning of period 0 ("LU-k"); and engines being mortgaged among others that have a term date, or a mortgage end date, denoted by k ("MS-K"). In an exemplary embodiment, retirement nodes only exist in the OS network. There is one node for each period, denoted by $N_{Rtr,0,t}^{OS}$. Each of the nodes has a type such as for example, a regular type ("Reg"); a switch type ("Swt"); a return type ("Rtn"); and a retire type ("Rtr"). The Reg type is a node that may exist in any type of network. The Swt type is a node that represents the possibility of a leased engine being "swapped" with an owned engine. Swapping a leased engine (or performing a "swap") with an owned engine includes returning an owned engine to the lessor instead of returning the leased engine. The Rtn type represents the possibility of returning a leased engine to the lessor and also the possibility of converting a mortgaged engine to an owned engine. The Rtr type represents the possibility of retiring an owned engine. In an exemplary embodiment, the system 10 creates an engine optimization network using the nodes, the arcs, and the networks. The engine optimization network generates all possible changes in state for each engine within the engine fleet during the planning horizon or the planning period using the nodes, the arcs, and the networks. In an exemplary embodiment, the engine optimization network generates all possible changes in state for each engine within the engine fleet during the planning horizon using the optimal aircraft fleet solution. An example of a portion of an engine optimization network 430 involving owned engines is illustrated in FIG. 11. The engine optimization network 430 includes an "initially parked" network 435, an "active" network 440, and a "temporarily parked" network 445.

In an exemplary embodiment, the system 10 simultaneously generates an optimal single-engine solution for each engine within the engine fleet at the step 415d. In combination, the optimal single-engine solutions for each of the engines include the optimal engine fleet solution. In an exemplary embodiment, the optimal engine fleet solution provides which engines should be parked in which time periods, when to perform EHM2 and to what condition, how to utilize upgrade opportunities, how to return a leased engine (which, if any, L/R conditions should be satisfied), when to swap a mortgaged engine with an owned engine, which owned engine should be swapped with a mortgaged engine, and when to retire an owned engine. In an exemplary embodiment, the system 10 executes an engine optimization model using the engine optimization network 430 to consider all possible changes in state for each engine and to simultaneously determine an optimal single-engine solution for each of the engines within the engine fleet. In an exemplary embodiment, the engine optimization model uses a mixed-integer program formulation to determine the optimal engine fleet solution. In an exemplary embodiment, the mixed-integer program can be mathematically written as follows:

Minimize:

$$\sum_m \sum_n \sum_j \sum_t \sum_{N_{n',j',t'}^{m'} \in \Omega_{n,j,t}^m} c_{n,j,t-n',j',t'}^{m-m'} N_{n,j,t}^m N_{n',j',t'}^{m'} \quad (7)$$

Subject to:

$$\sum_{N_{n',j',t'}^{m'} \in \Omega_{n,j,t}^m} N_{n,j,t}^m N_{n',j',t'}^{m'} = \alpha_j^m \forall\, m, n, j, t = 0 \quad (8)$$

$$\sum_{N_{n',j',t'}^{m'} \in \Omega_{n,j,t}^m} N_{n',j',t'}^{m'} N_{n,j,t}^m - \sum_{N_{n',j',t'}^{a'} \in \Omega_{n,j,t}^a} N_{n,j,t}^m N_{n',j',t'}^{m'} = 0 \quad (9)$$

where $\forall\, m, n, j, t > 0$ $$N_{Reg,j,t}^{LS-k} N_{Swt,j,t}^{LS-k} = \Sigma_{j'>1} N_{Reg,j',t}^{OS} N_{Swt,j,t}^{LS-k} \quad (10)$$

where $\forall$ all Swt nodes $$N_{Reg,j,t}^{LS-k} N_{Swt,j,t}^{LS-k} = N_{Swt,j,t}^{LS-k} N_{Rtb,j,t}^{LS-k} \quad (11)$$

where $\forall$ all Swt nodes $$\Sigma_{j'=j} N_{Reg,j,t}^{LS-k} N_{Rm,j,t}^{LS-k} + \Sigma_j N_{Swt,j',t}^{LS-k} N_{Rm,j,t}^{LS-} \\ k = \beta^{LS-k} + \beta^{LU-k} \quad (12)$$

where $\forall\, j = u^{LS-k},\ t = \tau^{LS-k}$ $$\Sigma_j N_{Reg,j,t}^{LS-l} N_{Rm,j,t}^{OS} = \beta^{MS-l} \forall t = \tau^{MS-l} \quad (13)$$

$$\Sigma_j N_{Reg,j,t}^{OS} N_{Rtn,o,t}^{OS} = R_t \forall t \quad (14)$$

$$\Sigma_{m \in \{OS, LS-k, MS-l\}} \Sigma_j \Sigma_{j'} N_{Reg,j,t}^m N_{REG,j',t+1}^m + \Sigma_{m \in \{OU, LU-k\}} \Sigma_j \Sigma_{j'S-G_j} {}^m N_{Reg,j,t}^m N_{Reg,j',t+1}^m + \Sigma_{m \in \{LS-k\}} \Sigma_j N_{Swt,j,t}^m N_{Reg,j-\delta,t+1}^{OS} = A_t \quad (15)$$

$$\sum_m \sum_{j' \in G_{j,t}, m_{j'} \geq \lambda} N_{Reg,j,t}{}^m N_{Reg,j',t+1}{}^m \leq E_t \quad (16)$$

$$\sum_{t \in y} \sum_m \sum_{j' \in G_{j,t}, m_{j'} \geq \lambda} N_{Reg,j,t}{}^m N_{Reg,j',t+1}{}^m \leq E_y \quad (17)$$

$$\sum_{j' \in G_{j,t}} {}^a N_{Reg,j,t}{}^m N_{Reg,j',t+1}{}^m \leq p_{j,t}{}^m \quad (18)$$

$$N_{Reg,j,s}{}^m N_{Reg,j,s+1}{}^m \geq \sum_{j' \in G_{j,t}} {}^m N_{Reg,j,t}{}^m N_{Reg,j',t+1}{}^m \quad (19)$$

where $\forall m \in \{OU, LU-k\}$, $0 \ll s < t$ $$N_{Reg,j-(t-s),s}{}^m N_{Reg,j-(t-s)+1,s+1}{}^m \geq \sum_{j' \in G_{j,t}} {}^a N_{Reg,j,t}{}^m N_{Reg,j',t+1}{}^m \quad (20)$$

where $\forall m \in \{OS, LS-k, MS-l\}$, $0 \leq s < t$

Where:

$0 \leq N_{n,j,t}{}^m N_{n',j',t'}{}^{m'} \leq u$ where $u = \beta^{OS} + \beta^{OU}$ $\forall m = \{OS, OP\}$;

$u = \beta^m$ $\forall m = \{MS-l, OU, LU-k\}$;

$u = \beta^{LS-k} + \beta^{LU-k}$ $\forall m \{LS-k, LP-k\}$;

In an exemplary embodiment, the objective of function (7) is to minimize the costs associated with the engine fleet. Constraint sets (8) and (9) ensure the number of engines leaving a node must be equal to the number of engines entering that node (the sum of the values of the arcs extending towards one node must equal to the sum of the value of the arcs extending away from the node). Constraint set (10) ensures that the number of leased engines going into Switch node $N_{Swt,j,t}{}^{LS-k}$ must be equal to the number of owned engines going into the same switch node (so that they can be switched one-for-one). Constraint set (11) ensures that the number of leased engines going into switch node $N_{n,j,t}{}^{LS-k}$ must be equal to the number of engines returned in period t (so that the same number of engines are actually returned). Constraint sets (12) and (13) ensure that the leased engines must be returned in the return period per contractual requirement (L/R condition). In an exemplary embodiment, all engines in network LS-k must be returned with condition j in period t, as specified by index k. That is, all leased engines, serviceable and unserviceable, belonging to either the network LS-k or the network LU-k at the beginning of the period 0, must be either returned directly or swapped with an owned engine. These leased engines have a return period of $\tau^{LS-k}$ with a condition of $\beta^{LS-k}$. In an exemplary embodiment, all mortgaged engines belonging to the network MS-l must be returned at period $\tau^{MS-l}$. Constraint set (14) ensures that the number of engines retiring in the time period t must be no less than the minimum number of engines that should have the status of retired required by fleet operations in period t. Constraint set (15) ensures that the number of active engines in the time period t must be equal to the number required by fleet operations. Active engines include those in use and those in the shop for EHM2. All engines in the networks OS, LS-k, and MS-l are active engines as they are either in use or in shop for EHM1, while engines in the networks OU and LU-k that are in the shop for EHM2 visits are active. In addition, a leased engine that is swapped with an owned engine and is put into use immediately after switching is considered an active engine. Constraint sets (16) and (17) ensure that the optimal engine fleet solution is within the EHM2 budget. Constraint set (18) ensures that for a node with an upgrade opportunity $N_{Reg,j,t}{}^m$ where $m = \{OS, OU, LS-k, LU-k, MS-l\}$, the number of engines that can be upgraded must be no greater than the number of engines that are given an upgrade opportunity. Constraint sets (19) and (20) ensure that if an engine takes the upgrade opportunity, it must follow the path that leads to the upgrade node. That is, an initially unserviceable engine with an initial condition of j that has an upgrade opportunity in period t must be remain unserviceable from period 0 to t−1; an initially serviceable engine with an initial condition of j that has an upgrade period t must be in use from period 0 to t−1. In an exemplary embodiment, a leased engine that has a return date prior to the start date will be excluded from the engine optimization model. In an exemplary embodiment, a mortgaged engine that has a term date prior to the start date will be considered as an owned engine. In an exemplary embodiment, leased engines that have a return date beyond the planning period T will be considered returning in period T+1; and the number engines that should have an active status, as required by fleet operations, in period T+1 must be 0. For a natural time date of d, corresponding to period t, the system 10 assumed that: an engine with a return date of d will be returned at the beginning of period t; and an engine with an upgrade opportunity on the date of d means that if it foregoes the upgrade opportunity, it may be in use or at park in period t (after performing EHM1/PGM); if it takes the upgrade opportunity, it will be in the shop for an EHM2 visit in period t and will be available for in-use/at-park in period t+1 with an increased engine life. In an exemplary embodiment, the engine optimization model does not decrease the RELV for a parked engine. In an exemplary embodiment, if a mortgaged engine that has a return date in period $t_r$ and has an upgrade opportunity in period $t_g$ where $t_g \geq t_r$, and if the mortgaged engine does not take the upgrade opportunity, then it will become an owned engine at the beginning of period $t_r$ and be treated as an owned engine in period t. However, if the mortgaged engine takes the upgrade opportunity, then it will in use in every period until the end of period $t_g-1$, have an EHM1 visit in period $t_g$, and then become an owned engine at the beginning of period $t_g+1$ and be available for in-use/at-park in period $t_g+1$.

In an exemplary embodiment, the system 10 displays the optimal engine fleet solution on the remote user device 130 at the step 420. A portion of the optimal engine fleet solution is displayed using a screen display 450. In an exemplary embodiment, the optimal engine fleet solution includes a plurality of schedules and summaries. In an exemplary embodiment, the optimal engine fleet solution ensures that a number of engines that have an active status is either equal to, at least, or at most the number of active engines required by the program parameters or by fleet operations. In an exemplary embodiment, the optimal engine fleet solution totals the engine shop costs associated with each of the engines 45, 50, 60, 65, 76, 80, 90, 95, 105, 110, 120 and 125 for each time period and/or for the planning period. In an exemplary embodiment, the optimal engine fleet solution provides a cost summary that totals costs relating to the maintenance of each of the engines 45, 50, 60, 65, 76, 80, 90, 95, 105, 110, 120 and 125 for each time period and/or for the planning period. In an exemplary embodiment, the optimal engine fleet solution totals the costs associated with the L/R events. In an exemplary embodiment, the optimal engine fleet solution provides a maintenance schedule for each of the engines 45, 50, 60, 65, 76, 80, 90, 95, 105, 110, 120 and 125 having engine shop costs less than or equal to the budget amount. In an exemplary embodiment, the optimal engine fleet solution ensures the L/R conditions are satisfied. In an exemplary embodiment, the optimal engine fleet solution provides a maintenance schedule that assigns a time period to complete maintenance activities for each leased engine so that each leased engine meets or exceeds the LLP return condition; does not meet or exceed the LLP return condition but meets or exceeds a minimum buy-out condition; or does not meet or exceed the LLP return condition and does not meet or exceed the minimum buy-out condition on the return date. In an exemplary embodiment, the optimal engine fleet solution recommends when to park serviceable engines, when to activate unserviceable engines, and when to upgrade the RELV of an engine. In an exemplary embodiment, the optimal engine fleet solution determines whether a leased aircraft should be returned having conditions that satisfy the L/R conditions or should be swapped with an owned engine. In an exemplary embodiment, the optimal engine fleet solution determines which owned engine should be swapped with a leased engine. In an exemplary embodiment, the optimal engine fleet solution provides a summary of all maintenance activities that will be completed by time period.

In an exemplary embodiment, the method 400 may be used to minimize costs associated with maintenance activities, specifically costs associated with heavy visits. In an exemplary embodiment, the method 400 may be used to cost effectively prepare for a lease return. In an exemplary embodiment, the method 400 may be used to determine when to swap an owned engine with a leased engine to avoid the buy-out cost, or a lease return penalty. In an exemplary embodiment, the method 400 may be used to determine when to swap a mortgaged engine with an owned engine to minimize the engine shop costs associated with the mortgaged engine. In an exemplary embodiment, the method 400 is used to determine when to swap a mortgaged engine with an owned engine to avoid satisfying a contractual requirement associated with the mortgaged engine, such as relating to performing maintenance activities or parking or retiring the mortgaged engine. In an exemplary embodiment, the method 400 may be used to schedule maintenance activities for each of the engines over the planning period so that the budget amount is not exceed for each of the time periods within the planning period. In an exemplary embodiment, the method 400 may be used to effectively utilize upgrade and partial upgrade opportunities. In an exemplary embodiment, the method 400 may be used to determine when to retire an owned engine. In an exemplary embodiment, the method 400 may be used to schedule premature EHM2 visits to avoid exceeds the budget amount. In an exemplary embodiment, the method 400 may be used to determine when to park engines. In an exemplary embodiment, the method 400 may be used to effectively manage mortgaged and financed engines to avoid EHM2 costs. In an exemplary embodiment, the method 400 may be used to minimize the engine shop costs for the engine fleet through the planning period T. In an exemplary embodiment, the method 400 may be used to determine an engine deposition schedule that includes a schedule of when to retire certain engines within the plurality of engines and when to return a leased engine (either on the return date or after the return date) and in what condition to return a leased engine. In an exemplary embodiment, the deposition schedule also determines when to swap a leased engine with an owned engine, which owned engine should be swapped with a leased engine, when to swap a mortgaged engine with an owned engine, and which owned engine should be swapped with a leased engine.

In an exemplary embodiment, the method 400 may use at least a portion of the optimal aircraft fleet solution generated in the method 140 to determine the optimal engine fleet solution during the step 415.

In an exemplary embodiment, the system 10 provides for asset disposition, overhaul planning (schedule of maintenance activities), and ownership strategy for a plurality of assets that comprise an asset fleet. In an exemplary embodiment, the system 10, using the optimization models, considers interactions among assets and generates an optimal solution for each asset simultaneously. In an exemplary embodiment, the system 10 simultaneously considers the engine and the aircraft data to provide an optimal solution that complies with the program parameters. In an exemplary embodiment, the system 10 provides a planning tool for determining which assets to retire from a fleet and when to retire the assets, when to change the ownership status of an asset with the fleet, and when to perform maintenance activities on assets within the fleet. In an exemplary embodiment, the system 10 provides a list of assets to retire, sorted by a retirement date. In an exemplary embodiment, the system 10 produces a schedule detailing when to perform maintenance on an aircraft asset (engine or aircraft), what type of maintenance is to be performed on the asset (what condition to build back), when to change the status of the asset (when to park or retire an engine and/or aircraft), how to prepare for a lease return, which lease contract to extend and for how long, which engine and aircraft to sell, how to effectively utilize upgrade opportunities, and how to schedule premature overhaul visits (EHM2). In an exemplary embodiment, the system 10 ensures that the aircraft fleet and the engine fleet include sufficient aircrafts and engines, respectively, to satisfy operational needs for each time period within the planning period. In an exemplary embodiment, the system 10 evaluates different lease return options, including repairing the engine, swapping the engine, and paying the buy-out cost. In an exemplary embodiment, the system 10 considers different ownership statuses, contractual requirements, current engine and aircraft states, ages of the assets, budgets, sales plans, and lease extension payment methods while determining the optimal aircraft fleet solution and/or the optimal engine fleet solution.

Figure 13:
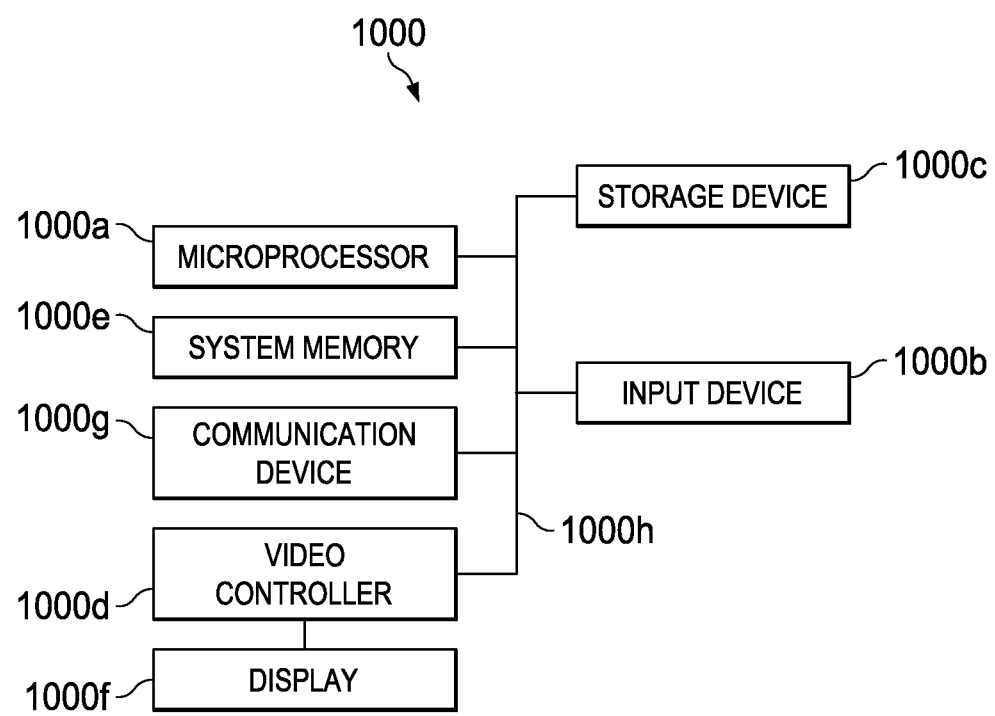
FIG. 13 is a diagrammatic illustration of a computing device for implementing one or more exemplary embodiments of the present disclosure, according to an exemplary embodiment.

In an exemplary embodiment, as illustrated in FIG. 13 with continuing reference to FIGS. 1, 2, 3, 4, 5, 6, 7, 8, 9, 10, 11, 12, and 13, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In an exemplary embodiment, the computer readable medium is a non-transitory tangible media. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the module 12, the computer processor 14, the computer readable medium 16, the database 18, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, the module 12, the computer processor 14, the computer readable medium 16, the database 18, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 22, and/or one or more portions thereof, may be designed to work on any specific architecture. In an exemplary embodiment, one or more portions of the network 22 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example.

In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 16, the system memory 1000e, and/or any combination thereof, may be executed by a processor to cause the processor to carry out or implement in whole or in part the operation of the system 10, one or more of the methods 36 and 100, and/or any combination thereof. In several exemplary embodiments, such a processor may include one or more of the computer processor 14, the processor 1000a, and/or any combination thereof. In several exemplary embodiments, such a processor may execute the plurality of instructions in connection with a virtual computer system.

A method has been described that includes receiving, using a computer system, aircraft data associated with a plurality of aircraft assets, wherein the aircraft data includes: data relating to a required maintenance activity for each aircraft asset within the plurality of aircraft assets, wherein the required maintenance activity for each aircraft asset is to occur within a planning period that includes a plurality of time periods; and data relating to an aircraft asset maintenance cost associated with the required maintenance activity for each aircraft asset; generating, using the computer system and the aircraft data, an aircraft asset optimization network; receiving, using the computer system, model parameters that include an aircraft asset budget amount associated with a time period within the plurality of time periods; and executing, using the computer system and the aircraft asset optimization network, an aircraft asset optimization model to generate an aircraft asset combination that includes an aircraft asset maintenance schedule and an aircraft asset cost summary; wherein the aircraft asset maintenance schedule assigns a time period within the plurality of time periods to complete the required maintenance activity for each aircraft asset; wherein the aircraft asset cost summary provides a total aircraft asset maintenance cost per time period for each time period within the plurality of time periods that is a sum of the aircraft asset maintenance costs within a time period; and wherein the total aircraft asset maintenance cost per time period is less than or equal to the aircraft asset budget amount. In an exemplary embodiment, aircraft data further includes: the aircraft data further includes data related to respective ones of the aircraft assets that are leased; wherein each of the respective ones of the aircraft assets that are leased has: a contractual return condition associated with a return period; a contractual buyout condition associated with the return period; and a penalty cost associated with satisfying the contractual buyout condition at the return period and not satisfying the contractual return condition at the return period; wherein the aircraft asset maintenance schedule assigns a time period to complete the required maintenance activity for each of the respective ones of the aircraft assets that are leased to: satisfy the contractual return condition at the return period; satisfy the contractual buyout condition at the return period but not satisfy the contractual return condition; or not satisfy the contractual return condition or the contractual buyout condition at the return period; wherein the aircraft asset cost summary provides a total penalty cost per time period that is a sum of the penalty costs within a time period; and wherein the sum of the total aircraft asset maintenance cost per time period and the total penalty cost per time period associated with a time period is less than or equal to the aircraft asset budget amount. In an exemplary embodiment, each of the respective ones of the aircraft assets that are leased has: a return date within the return period; and a lease extension period that extends beyond the return period and that is associated with returning the each of the respective ones of the aircraft assets that are leased at a time period after the return period; wherein the aircraft data further includes data relating to an extension cost associated with returning the each of the respective ones of the aircraft assets that are leased within the lease extension period; wherein the aircraft asset combination further includes an aircraft asset deposition schedule; wherein the aircraft deposition schedule assigns a time period to return the each of the respective ones of the aircraft assets that are leased so that either: the each of the respective ones of the aircraft assets that are leased is returned within the return period; or the each of the respective ones of the aircraft assets that are leased asset is returned within the lease extension period; wherein the aircraft asset cost summary provides a total extension cost per time period that is a sum of the extension costs associated within a time period; and wherein the sum of the total aircraft asset maintenance cost per time period, the total penalty cost per time period, and the total extension cost per time period is less than or equal to the aircraft asset budget amount. In an exemplary embodiment, the aircraft data further comprises data related to respective ones of the aircraft assets that are owned; wherein a respective one of the aircraft assets that are owned may be returned in the place of a respective one of the aircraft assets that are leased at the return period associated with the respective one of the aircraft assets that are leased; and wherein the aircraft asset combination further comprises an aircraft asset deposition schedule that determines the respective one of the aircraft assets that are owned to be returned in the place of the respective one of the aircraft assets that are leased when the respective one of the aircraft assets that are leased does not satisfy the contractual return condition or the contractual buyout condition at the return period. In an exemplary embodiment, the aircraft data further comprises data related to respective ones of the aircraft assets that are mortgaged; wherein each of the respective ones of the aircraft assets that are mortgaged is associated with a contractual requirement; wherein a respective one of the aircraft assets that are owned may be swapped with a respective one of the aircraft assets that are mortgaged so that the respective one of the aircraft assets that are owned satisfies the contractual requirement associated with the respective one of the aircraft assets that are mortgaged; and wherein the aircraft asset deposition schedule determines which of the respective ones of the aircraft assets that are owned is to be swapped with the respective one of the aircraft assets that are mortgaged. In an exemplary embodiment, the aircraft data further includes data relating to the age of each aircraft asset within the plurality of aircraft assets; wherein the model parameters further include a maximum aircraft asset age; and wherein the aircraft asset combination further comprises an aircraft asset deposition schedule that assigns a time period to retire an aircraft asset having an age that exceeds the maximum aircraft age from the plurality of assets. In an exemplary embodiment, generating the aircraft asset optimization network includes: generating a plurality of nodes, each of the nodes corresponding to a state of an aircraft asset during a time period; and generating a plurality of relationship identifiers, defining a relationship between two nodes from the plurality of nodes, each of the relationship identifiers representing a change in state of the aircraft asset, wherein each of the relationship identifiers has a value associated with the change in state that includes the aircraft asset maintenance cost; and wherein executing the aircraft asset optimization model to generate the aircraft asset combination includes minimizing the sum of the values of the each of the relationship identifiers associated with each time period to simultaneously generate a single-aircraft asset maintenance schedule and a single-aircraft asset cost summary for each aircraft asset; and wherein the aircraft asset combination includes each single-aircraft asset maintenance schedule and each single-aircraft cost summary. In an exemplary embodiment, the aircraft data further includes availability status data for each aircraft asset within the plurality of aircraft assets that includes an active status associated with an aircraft asset that is active and an inactive status associated with an aircraft asset that is inactive; wherein the model parameters further include an active asset requirement associated with a minimum number of aircraft assets within the plurality of aircraft assets having an active status; and wherein the aircraft asset maintenance schedule assigns a time period to complete the aircraft asset required maintenance activity for each aircraft asset within the plurality of aircraft assets so that the number of aircraft assets within the plurality of aircraft assets having an active status satisfies the active aircraft asset requirement. In an exemplary embodiment, the aircraft asset is an engine. In an exemplary embodiment, the aircraft asset is an aircraft. In an exemplary embodiment, the method further includes receiving, using the computer system, engine data associated with a plurality of engines, wherein the engine data includes: data relating to a required engine maintenance activity for each engine within the plurality of engines, wherein the engine required maintenance activity is to occur within a planning period within the plurality of time periods; and data relating to an engine maintenance cost associated with the required engine maintenance activity; generating, using the computer system, the engine data, and the aircraft asset combination, an engine optimization network; and executing, using the computer system and the engine optimization network, an engine optimization model to generate an engine combination that includes an engine maintenance schedule and an engine cost summary; wherein the engine maintenance schedule assigns a time period within the plurality of time periods to complete the required engine maintenance activity for each engine within the plurality of engines; wherein the engine cost summary provides a total engine maintenance cost per time period for each time period within the plurality of time periods that is a sum of the engine maintenance costs within a time period; wherein the model parameters further include an engine budget amount associated with a time period within the plurality of time periods; and wherein the total engine maintenance cost per time period is less than or equal to the engine budget amount. In an exemplary embodiment, the aircraft asset combination is an optimal aircraft asset combination so that the aircraft asset maintenance schedule results in a minimized cumulative cost summary that is a sum of the total aircraft asset maintenance costs per time period, the total penalty cost per time period, and the total extension cost per time period for every time period in the planning period.

A apparatus has been described that includes a non-transitory computer readable medium; and a plurality of instructions stored on the non-transitory computer readable medium and executable by one or more processors, the plurality of instructions including: instructions that cause the one or more processors to receive aircraft data associated with a plurality of aircraft assets, wherein the aircraft data includes: data relating to a required maintenance activity for each aircraft asset within the plurality of aircraft assets, wherein the required maintenance activity for each aircraft asset is to occur within a planning period that includes a plurality of time periods; and data relating to an aircraft asset maintenance cost associated with the required maintenance activity for each aircraft asset; instructions that cause the one or more processors to generate, using the aircraft data, an aircraft asset optimization network; instructions that cause the one or more processors to receive model parameters that include an aircraft asset budget amount associated with a time period within the plurality of time periods; and instructions that cause the one or more processors to execute an aircraft asset optimization model to generate an aircraft asset combination that includes an aircraft asset maintenance schedule and an aircraft asset cost summary; wherein the aircraft asset maintenance schedule assigns a time period within the plurality of time periods to complete the required maintenance activity for each aircraft asset; wherein the aircraft asset cost summary provides a total aircraft asset maintenance cost per time period for each time period within the plurality of time periods that is a sum of the aircraft asset maintenance costs within a time period; and wherein the total aircraft asset maintenance cost per time period is less than or equal to the aircraft asset budget amount. In an exemplary embodiment, the aircraft data further includes data related to respective ones of the aircraft assets that are leased; wherein each of the respective ones of the aircraft assets that are leased has: a contractual return condition associated with a return period; a contractual buyout condition associated with the return period; and a penalty cost associated with satisfying the contractual buyout condition at the return period and not satisfying the contractual return condition at the return period; wherein the aircraft asset maintenance schedule assigns a time period to complete the required maintenance activity for each of the respective ones of the aircraft assets that are leased to: satisfy the contractual return condition at the return period; satisfy the contractual buyout condition at the return period but not satisfy the contractual return condition; or not satisfy the contractual return condition or the contractual buyout condition at the return period; wherein the aircraft asset cost summary provides a total penalty cost per time period that is a sum of the penalty costs within a time period; and wherein the sum of the total aircraft asset maintenance cost per time period and the total penalty cost per time period associated with a time period is less than or equal to the aircraft asset budget amount. In an exemplary embodiment, each of the respective ones of the aircraft assets that are leased has: a return date within the return period; and a lease extension period that extends beyond the return period and that is associated with returning the each of the respective ones of the aircraft assets that are leased at a time period after the return period; wherein the aircraft data further includes data relating to an extension cost associated with returning the each of the respective ones of the aircraft assets that are leased within the lease extension period; wherein the aircraft asset combination further includes an aircraft asset deposition schedule; wherein the aircraft asset deposition schedule assigns a time period to return the each of the respective ones of the aircraft assets that are leased so that either: the each of the respective ones of the aircraft assets that are leased is returned within the return period; or the each of the respective ones of the aircraft assets that are leased asset is returned within the lease extension period; wherein the aircraft asset cost summary provides a total extension cost per time period that is a sum of the extension costs associated within a time period; and wherein the sum of the total aircraft asset maintenance cost per time period, the total penalty cost per time period, and the total extension cost per time period is less than or equal to the aircraft asset budget amount. In an exemplary embodiment, the aircraft data further comprises data related to respective ones of the aircraft assets that are owned; wherein a respective one of the aircraft assets that are owned may be returned in the place of a respective one of the aircraft assets that are leased at the return period associated with the respective one of the aircraft assets that are leased; and wherein the aircraft asset combination further comprises an aircraft asset deposition schedule that determines which of the respective ones of the aircraft assets that are owned is to be returned in the place of the respective one of the aircraft assets that are leased when the respective one of the aircraft assets that are leased does not satisfy the contractual return condition or the contractual buyout condition at the return period. In an exemplary embodiment, the aircraft data further comprises data related to respective ones of the aircraft assets that are mortgaged; wherein each of the respective ones of the aircraft assets that are mortgaged is associated with a contractual requirement; wherein a respective one of the aircraft assets that are owned may be swapped with a respective one of the aircraft assets that are mortgaged so that the respective one of the aircraft assets that are owned satisfies the contractual requirement associated with the respective one of the aircraft assets that are mortgaged; and wherein the aircraft asset deposition schedule determines which of the respective ones of the aircraft assets that are owned is to be swapped with the respective one of the aircraft assets that are mortgaged. In an exemplary embodiment, the aircraft data further includes data relating to the age of each aircraft asset within the plurality of aircraft assets; wherein the model parameters further include a maximum aircraft asset age; and wherein the aircraft asset combination further includes an aircraft asset deposition schedule that assigns a time period to retire an aircraft asset having an age that exceeds the maximum aircraft age from the plurality of assets. In an exemplary embodiment, instructions that cause the one or more processors to generate the aircraft asset optimization network using the aircraft data includes: instructions that cause the one or more processors to generate a plurality of nodes, each of the nodes corresponding to a state of an aircraft asset during a time period; instructions that cause the one or more processors to generate a plurality of relationship identifiers, defining a relationship between two nodes from the plurality of nodes, each of the relationship identifiers representing a change in state of the aircraft asset, wherein each of the relationship identifiers has a value associated with the change in state that includes the aircraft asset maintenance cost; and instructions that cause the one or more processors to execute executing the aircraft asset optimization model to generate the aircraft asset combination includes minimizing the sum of the values of the each of the relationship identifiers associated with each time period to simultaneously generate a single-aircraft asset maintenance schedule and a single-aircraft asset cost summary for each aircraft asset; wherein the aircraft asset combination includes each single-aircraft asset maintenance schedule and each single-aircraft cost summary. In an exemplary embodiment, the aircraft data further includes availability status data for each aircraft asset within the plurality of aircraft assets that includes an active status associated with an aircraft asset that is active and an inactive status associated with an aircraft asset that is inactive; wherein the model parameters further include an active asset requirement associated with a minimum number of aircraft assets within the plurality of aircraft assets having an active status; and wherein the aircraft asset maintenance schedule assigns a time period to complete the aircraft asset required maintenance activity for each aircraft asset within the plurality of aircraft assets so that the number of aircraft assets within the plurality of aircraft assets having an active status satisfies the active aircraft asset requirement. In an exemplary embodiment, the aircraft asset is an engine. In an exemplary embodiment, the aircraft asset is an aircraft. In an exemplary embodiment, the plurality of instructions further comprise: instructions that cause the one or more processors to receive engine data associated with a plurality of engines, wherein the engine data includes: data relating to a required engine maintenance activity for each engine within the plurality of engines, wherein the engine required maintenance activity is to occur within a planning period within the plurality of time periods; and data relating to an engine maintenance cost associated with the required engine maintenance activity; instructions that cause the one or more processors to generate, using the engine data and the aircraft asset combination, an engine optimization network; and instructions that cause the one or more processors to execute, using the engine optimization network, an engine optimization model to generate an engine combination that includes an engine maintenance schedule and an engine cost summary; wherein the engine maintenance schedule assigns a time period within the plurality of time periods to complete the required engine maintenance activity for each engine within the plurality of engines; wherein the engine cost summary provides a total engine maintenance cost per time period for each time period within the plurality of time periods that is a sum of the engine maintenance costs within a time period; wherein the model parameters further include an engine budget amount associated with a time period within the plurality of time periods; and wherein the total engine maintenance cost per time period is less than or equal to the engine budget amount. In an exemplary embodiment, the aircraft asset combination is an optimal aircraft asset combination so that the aircraft asset maintenance schedule results in a minimized cumulative cost summary that is a sum of the total aircraft asset maintenance costs per time period, the total penalty cost per time period, and the total extension cost per time period for every time period in the planning period.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method, comprising:
    displaying a first screen on a graphical user interface, wherein the first screen comprises:
        a first box via which a first file is identified, wherein the first file contains first data relating to a required maintenance activity for each aircraft asset within a plurality of aircraft assets;
            wherein the required maintenance activity for each aircraft asset is to occur within a planning period that comprises a plurality of time periods;
        a second box via which a second file is identified, wherein the second file contains second data relating to an aircraft asset maintenance cost associated with the required maintenance activity for each aircraft asset; and
        a third box that is configured to receive a first model parameter within a plurality of model parameters;
    receiving or accessing, using a computer system, aircraft data associated with the plurality of aircraft assets, wherein the aircraft data comprises the first data and the second data:
        wherein receiving or accessing, using the computer system, the aircraft data comprises:
            receiving or accessing, using the computer system and the first box, the first data relating to the required maintenance activity for each aircraft asset within the plurality of aircraft assets; and receiving or accessing, using the computer system and the second box, the second data relating to the aircraft asset maintenance cost associated with the required maintenance activity for each aircraft asset;

generating, using the computer system and the aircraft data, an aircraft asset optimization network, wherein generating the aircraft asset optimization network comprises:

generating a sub-network for each aircraft asset in the plurality of aircraft assets, comprising:

generating a plurality of nodes including a first type of node, a second type of node, and a third type of node, the nodes corresponding to respective states of the each aircraft asset during respective time periods within the plurality of time periods;

generating a plurality of directional relationship identifiers, wherein each relationship identifier defines a relationship from one node from the plurality of nodes extending to another node from the plurality of nodes and represents a change, from one state to another state, of the each aircraft asset;

wherein the first type of node is a node that has one or more relationship identifiers extending from the node but has no relationship identifier extending to the node;

wherein the second type of node is a node that has one or more relationship identifiers extending to the node but has no relationship identifier extending from the node;

wherein the third type of node is a node that has one or more relationship identifiers extending to the node and one or more relationship identifiers extending from the node;

wherein a plurality of potential single-aircraft solutions for the each aircraft asset is formed by connecting, using the relationship identifiers, different pluralities of the nodes; and generating, using rules that define a value of a relationship identifier as a function of the change in state of the each aircraft asset and its associated aircraft asset maintenance costs, a value for each relationship identifier from the plurality of relationship identifiers;

wherein generating the aircraft asset optimization network results in each time period being associated with one or more relationship identifiers, which are associated with one or more of the sub-networks;

receiving, using the computer system and via the third box, the first model parameter within the plurality of model parameters; wherein the first model parameter is an aircraft asset budget amount associated with a respective time period within the plurality of time periods;

generating an aircraft asset optimization model for the planning period using: the aircraft asset optimization network; the plurality of model parameters; one or more predetermined rules; and a mixed-integer formulation that minimizes the costs associated with the plurality of aircraft assets while ensuring that a total aircraft asset maintenance cost per time period is less than or equal to the aircraft asset budget amount;

wherein the one or more predetermined rules comprises a rule preventing an invalid single-aircraft potential solution from being included in the mixed-integer formulation; and wherein an invalid potential single-aircraft solution is a potential single-aircraft solution from the plurality of potential single-aircraft solutions that comprises one or more nodes of the third type that has a number of relationship identifiers extending from the node that is not equal to the number of relationship identifiers extending to the node;

executing, using the computer system, the aircraft asset optimization model to generate an aircraft asset combination that comprises an aircraft asset maintenance schedule and an aircraft asset cost summary, wherein executing the aircraft asset optimization model to generate the aircraft asset combination comprises:

omitting, in accordance with the rule, one or more invalid potential single-aircraft solutions from the mixed-integer formulation; and minimizing, using the mixed-integer formulation and the respective pluralities of potential single-aircraft solutions for each of the aircraft assets, the sum of the respective values of the one or more relationship identifiers associated with each time period to simultaneously generate a single-aircraft asset maintenance schedule and a single-aircraft asset cost summary for each of the aircraft assets;

wherein the aircraft asset maintenance schedule assigns a time period within the plurality of time periods to complete the required maintenance activity for each of the aircraft assets;

wherein the aircraft asset cost summary provides a total aircraft asset maintenance cost per time period for each time period within the plurality of time periods that is a sum of the aircraft asset maintenance costs within a time period;

wherein the total aircraft asset maintenance cost per time period is less than or equal to the aircraft asset budget amount;

and wherein the aircraft asset combination comprises each single-aircraft asset maintenance schedule and each single-aircraft cost summary;

displaying a second screen on the graphical user interface, wherein the second screen comprises at least a portion of the aircraft asset combination;

and changing the respective states of one or more aircraft assets in accordance with their respective single-aircraft asset maintenance schedules.

2. The method of claim 1, wherein the aircraft data further comprises data related to respective ones of the aircraft assets that are leased;

wherein each of the respective ones of the aircraft assets that are leased has:

a contractual return condition associated with a return period;

a contractual buyout condition associated with the return period; and a penalty cost associated with satisfying the contractual buyout condition at the return period and not satisfying the contractual return condition at the return period;

wherein the aircraft asset maintenance schedule assigns a time period to complete the required maintenance activity for each of the respective ones of the aircraft assets that are leased to:

satisfy the contractual return condition at the return period;

satisfy the contractual buyout condition at the return period but not satisfy the contractual return condition; or not satisfy the contractual return condition or the contractual buyout condition at the return period;

wherein the aircraft asset cost summary provides a total penalty cost per time period that is a sum of the penalty costs within a time period; and wherein the sum of the total aircraft asset maintenance cost per time period and the total penalty cost per time period associated with a time period is less than or equal to the aircraft asset budget amount.

3. The method of claim 2, wherein each of the respective ones of the aircraft assets that are leased has:
  a return date within the return period; and
  a lease extension period that extends beyond the return period and that is associated with returning the each of the respective ones of the aircraft assets that are leased at a time period after the return period;

wherein the aircraft data further comprises data relating to an extension cost associated with returning the each of the respective ones of the aircraft assets that are leased within the lease extension period;

wherein the aircraft asset combination further comprises an aircraft asset deposition schedule;

wherein the aircraft asset deposition schedule assigns a time period to return the each of the respective ones of the aircraft assets that are leased so that either:
  the each of the respective ones of the aircraft assets that are leased is returned within the return period; or
  the each of the respective ones of the aircraft assets that are leased asset is returned within the lease extension period;

wherein the aircraft asset cost summary provides a total extension cost per time period that is a sum of the extension costs associated within a time period; and wherein the sum of the total aircraft asset maintenance cost per time period, the total penalty cost per time period, and the total extension cost per time period is less than or equal to the aircraft asset budget amount.

4. The method of claim 2, wherein the aircraft data further comprises data related to respective ones of the aircraft assets that are owned;

wherein a respective one of the aircraft assets that are owned may be returned in the place of a respective one of the aircraft assets that are leased at the return period associated with the respective one of the aircraft assets that are leased; and wherein the aircraft asset combination further comprises an aircraft asset deposition schedule that determines which of the respective ones of the aircraft assets that are owned is to be returned in the place of the respective one of the aircraft assets that are leased when the respective one of the aircraft assets that are leased does not satisfy the contractual return condition or the contractual buyout condition at the return period.

5. The method of claim 4, wherein the aircraft data further comprises data related to respective ones of the aircraft assets that are mortgaged;

wherein each of the respective ones of the aircraft assets that are mortgaged is associated with a contractual requirement;

wherein a respective one of the aircraft assets that are owned may be swapped with a respective one of the aircraft assets that are mortgaged so that the respective one of the aircraft assets that are owned satisfies the contractual requirement associated with the respective one of the aircraft assets that are mortgaged; and wherein the aircraft asset deposition schedule determines which of the respective ones of the aircraft assets that are owned is to be swapped with the respective one of the aircraft assets that are mortgaged.

6. The method of claim 1, wherein the aircraft data further comprises data relating to the age of each aircraft asset within the plurality of aircraft assets;

wherein the plurality of model parameters further comprises a maximum aircraft asset age; and wherein the aircraft asset combination further comprises an aircraft asset deposition schedule that assigns a time period to retire an aircraft asset having an age that exceeds the maximum aircraft age from the plurality of assets.

7. The method of claim 1, wherein the aircraft data further comprises availability status data for each aircraft asset within the plurality of aircraft assets that includes an active status associated with an aircraft asset that is active and an inactive status associated with an aircraft asset that is inactive;

wherein the plurality of model parameters further comprises an active asset requirement associated with a minimum number of aircraft assets within the plurality of aircraft assets having an active status; and wherein the aircraft asset maintenance schedule assigns a time period to complete the aircraft asset required maintenance activity for each aircraft asset within the plurality of aircraft assets so that the number of aircraft assets within the plurality of aircraft assets having an active status satisfies the active aircraft asset requirement.

8. The method of claim 1, wherein the aircraft asset is an engine.

9. The method of claim 1, wherein the aircraft asset is an aircraft.

10. The method of claim 9, wherein the method further comprises:
  receiving, using the computer system, engine data associated with a plurality of engines, wherein the engine data comprises:
    data relating to a required engine maintenance activity for each engine within the plurality of engines, wherein the engine required maintenance activity is to occur within a planning period within the plurality of time periods; and
    data relating to an engine maintenance cost associated with the required engine maintenance activity;
  generating, using the computer system, the engine data, and the aircraft asset combination, an engine optimization network; and
  executing, using the computer system and the engine optimization network, an engine optimization model to generate an engine combination that comprises an engine maintenance schedule and an engine cost summary;
  wherein the engine maintenance schedule assigns a time period within the plurality of time periods to complete the required engine maintenance activity for each engine within the plurality of engines;
  wherein the engine cost summary provides a total engine maintenance cost per time period for each time period within the plurality of time periods that is a sum of the engine maintenance costs within a time period;

wherein the plurality of model parameters further comprises an engine budget amount associated with a time period within the plurality of time periods; and
wherein the total engine maintenance cost per time period is less than or equal to the engine budget amount.

11. The method of claim 3, wherein the aircraft asset combination is an optimal aircraft asset combination so that the aircraft asset maintenance schedule results in a minimized cumulative cost summary that is a sum of the total aircraft asset maintenance costs per time period, the total penalty cost per time period, and the total extension cost per time period for every time period in the planning period.

12. An apparatus comprising:
a non-transitory computer readable medium; and
a plurality of instructions stored on the non-transitory computer readable medium and executable by one or more processors, the plurality of instructions comprising:
   instructions that cause the one or more processors to display a first screen on a graphical user interface, wherein the first screen comprises:
      a first box via which a first file is identified, wherein the first file contains first data relating to a required maintenance activity for each aircraft asset within a plurality of aircraft assets;
      wherein the required maintenance activity for each aircraft asset is to occur within a planning period that comprises a plurality of time periods;
      a second box via which a second file is identified, wherein the second file contains second data relating to an aircraft asset maintenance cost associated with the required maintenance activity for each aircraft asset; and
      a third box that is configured to receive a first model parameter within a plurality of model parameters;
   instructions that cause the one or more processors to receive or access aircraft data associated with the plurality of aircraft assets, wherein the aircraft data comprises the first data and the second data:
      wherein the instructions that cause the one or more processors to receive or access aircraft data associated with the plurality of aircraft assets comprises:
         instructions that cause the one or more processors receive or access, using the first box, the first data relating to the required maintenance activity for each aircraft asset within the plurality of aircraft assets; and
         instructions that cause the one or more processors receive or access, using the second box, the second data relating to the aircraft asset maintenance cost associated with the required maintenance activity for each aircraft asset;
   instructions that cause the one or more processors to generate, using the aircraft data, an aircraft asset optimization network, wherein instructions that cause the one or more processors to generate the aircraft asset optimization network using the aircraft data comprises:
      instructions that cause the one or more processors to generate, a sub-network for each aircraft asset in the plurality of aircraft assets, comprising:
         instructions that cause the one or more processors to generate a plurality of nodes including a first type of node, a second type of node, and a third type of node, the nodes corresponding to respective states of the each aircraft asset during respective time periods within the plurality of time periods;
         instructions that cause the one or more processors to generate a plurality of directional relationship identifiers, wherein each relationship identifier defines a relationship from one node from the plurality of nodes extending to another node from the plurality of nodes and represents a change, from one state to another state, of the each aircraft asset;
         wherein the first type of node is a node that has one or more relationship identifiers extending from the node but has no relationship identifier extending to the node;
         wherein the second type of node is a node that has one or more relationship identifiers extending to the node but has no relationship identifier extending from the node;
         wherein the third type of node is a node that has one or more relationship identifiers extending to the node and one or more relationship identifiers extending from the node;
         wherein a plurality of potential single-aircraft solutions for the each aircraft asset is formed by connecting, using the relationship identifiers, different pluralities of the nodes; and
      instructions that cause one or more processors to generate, using rules that define a value of a relationship identifier as a function of the change in state of the each aircraft asset and its associated aircraft asset maintenance costs, a value for each relationship identifier from the plurality of relationship identifiers;
      wherein generating the aircraft asset optimization network results in each time period being associated with one or more relationship identifiers, which are associated with one or more of the sub-networks;
   instructions that cause the one or more processors to receive via the third box, the first model parameter from the plurality of model parameters; wherein the first model parameter is an aircraft asset budget amount associated with a respective time period within the plurality of time periods;
   instructions that cause the one or more processors to generate an aircraft asset optimization model for the planning period using: the aircraft asset optimization network; the plurality of model parameters; one or more predetermined rules; and a mixed-integer formulation that minimizes the costs associated with the plurality of aircraft assets while ensuring that a total aircraft asset maintenance cost per time period is less than or equal to the aircraft asset budget amount;
   wherein the one or more predetermined rules comprises a rule preventing an invalid single-aircraft potential solution from being included in the mixed-integer formulation; and
   wherein an invalid potential single-aircraft solution is a potential single-aircraft solution from the plurality of potential single-aircraft solutions that comprises one or more nodes of the third type that has a number of relationship identifiers extending from the node that is not equal to the number of relationship identifiers extending to the node;
   instructions that cause the one or more processors to execute the aircraft asset optimization model to generate an aircraft asset combination that comprises an aircraft asset maintenance schedule and an aircraft asset cost summary, wherein the instructions that cause the one or more processors to execute the aircraft asset optimization model to generate the aircraft asset combination comprises:
  omitting, in accordance with the rule, the one or more invalid potential single-aircraft solutions from the mixed-integer formulation; and
  minimizing, using the mixed-integer formulation and the respective pluralities of potential single-aircraft solutions for each of the aircraft assets, the sum of the respective values of the one or more relationship identifiers associated with each time period to simultaneously generate a single-aircraft asset maintenance schedule and a single-aircraft asset cost summary for each of the aircraft assets;
  wherein the aircraft asset maintenance schedule assigns a time period within the plurality of time periods to complete the required maintenance activity for each of the aircraft assets;
  wherein the aircraft asset cost summary provides a total aircraft asset maintenance cost per time period for each time period within the plurality of time periods that is a sum of the aircraft asset maintenance costs within a time period;
  wherein the total aircraft asset maintenance cost per time period is less than or equal to the aircraft asset budget amount; and
  wherein the aircraft asset combination comprises each single-aircraft asset maintenance schedule and each single-aircraft cost summary;
instructions that cause the one or more processors to display a second screen on the graphical user interface, wherein the second screen comprises at least a portion of the aircraft asset combination;
and
instructions that cause the one or more processors to change the respective states of one or more aircraft assets in accordance with their respective single-aircraft asset maintenance schedules.

13. The apparatus of claim 12,
wherein the aircraft data further comprises data related to respective ones of the aircraft assets that are leased;
wherein each of the respective ones of the aircraft assets that are leased has:
  a contractual return condition associated with a return period;
  a contractual buyout condition associated with the return period; and
  a penalty cost associated with satisfying the contractual buyout condition at the return period and not satisfying the contractual return condition at the return period;
wherein the aircraft asset maintenance schedule assigns a time period to complete the required maintenance activity for each of the respective ones of the aircraft assets that are leased to:
  satisfy the contractual return condition at the return period;
  satisfy the contractual buyout condition at the return period but not satisfy the contractual return condition; or
  not satisfy the contractual return condition or the contractual buyout condition at the return period;
wherein the aircraft asset cost summary provides a total penalty cost per time period that is a sum of the penalty costs within a time period; and
wherein the sum of the total aircraft asset maintenance cost per time period and the total penalty cost per time period associated with a time period is less than or equal to the aircraft asset budget amount.

14. The apparatus of claim 13,
wherein each of the respective ones of the aircraft assets that are leased has:
  a return date within the return period; and
  a lease extension period that extends beyond the return period and that is associated with returning the each of the respective ones of the aircraft assets that are leased at a time period after the return period;
wherein the aircraft data further comprises data relating to an extension cost associated with returning the each of the respective ones of the aircraft assets that are leased within the lease extension period;
wherein the aircraft asset combination further comprises an aircraft asset deposition schedule;
wherein the aircraft asset deposition schedule assigns a time period to return the each of the respective ones of the aircraft assets that are leased so that either:
  the each of the respective ones of the aircraft assets that are leased is returned within the return period; or
  the each of the respective ones of the aircraft assets that are leased asset is returned within the lease extension period;
wherein the aircraft asset cost summary provides a total extension cost per time period that is a sum of the extension costs associated within a time period; and
wherein the sum of the total aircraft asset maintenance cost per time period, the total penalty cost per time period, and the total extension cost per time period is less than or equal to the aircraft asset budget amount.

15. The apparatus of claim 13,
wherein the aircraft data further comprises data related to respective ones of the aircraft assets that are owned;
wherein a respective one of the aircraft assets that are owned may be returned in the place of a respective one of the aircraft assets that are leased at the return period associated with the respective one of the aircraft assets that are leased; and
wherein the aircraft asset combination further comprises an aircraft asset deposition schedule that determines which of the respective ones of the aircraft assets that are owned is to be returned in the place of the respective one of the aircraft assets that are leased when the respective one of the aircraft assets that are leased does not satisfy the contractual return condition or the contractual buyout condition at the return period.

16. The apparatus of claim 15,
wherein the aircraft data further comprises data related to respective ones of the aircraft assets that are mortgaged;
wherein each of the respective ones of the aircraft assets that are mortgaged is associated with a contractual requirement;
wherein a respective one of the aircraft assets that are owned may be swapped with a respective one of the aircraft assets that are mortgaged so that the respective one of the aircraft assets that are owned satisfies the contractual requirement associated with the respective one of the aircraft assets that are mortgaged; and
wherein the aircraft asset deposition schedule determines which of the respective ones of the aircraft assets that are owned is to be swapped with the respective one of the aircraft assets that are mortgaged.

17. The apparatus of claim 12, wherein the aircraft data further comprises data relating to the age of each aircraft asset within the plurality of aircraft assets;
  wherein the plurality of model parameters further comprises a maximum aircraft asset age; and
  wherein the aircraft asset combination further comprises an aircraft asset deposition schedule that assigns a time period to retire an aircraft asset having an age that exceeds the maximum aircraft age from the plurality of assets.

18. The apparatus of claim 12,
  wherein the aircraft data further comprises availability status data for each aircraft asset within the plurality of aircraft assets that includes an active status associated with an aircraft asset that is active and an inactive status associated with an aircraft asset that is inactive;
  wherein the plurality of model parameters further comprises an active asset requirement associated with a minimum number of aircraft assets within the plurality of aircraft assets having an active status; and
  wherein the aircraft asset maintenance schedule assigns a time period to complete the aircraft asset required maintenance activity for each aircraft asset within the plurality of aircraft assets so that the number of aircraft assets within the plurality of aircraft assets having an active status satisfies the active aircraft asset requirement.

19. The apparatus of claim 12, wherein the aircraft asset is an engine.

20. The apparatus of claim 12, wherein the aircraft asset is an aircraft.

21. The apparatus of claim 18, wherein the plurality of instructions further comprise:
  instructions that cause the one or more processors to receive engine data associated with a plurality of engines, wherein the engine data comprises:
    data relating to a required engine maintenance activity for each engine within the plurality of engines, wherein the engine required maintenance activity is to occur within a planning period within the plurality of time periods; and
    data relating to an engine maintenance cost associated with the required engine maintenance activity;
  instructions that cause the one or more processors to generate, using the engine data and the aircraft asset combination, an engine optimization network; and
  instructions that cause the one or more processors to execute, using the engine optimization network, an engine optimization model to generate an engine combination that comprises an engine maintenance schedule and an engine cost summary;
  wherein the engine maintenance schedule assigns a time period within the plurality of time periods to complete the required engine maintenance activity for each engine within the plurality of engines;
  wherein the engine cost summary provides a total engine maintenance cost per time period for each time period within the plurality of time periods that is a sum of the engine maintenance costs within a time period;
  wherein the plurality of model parameters further comprises an engine budget amount associated with a time period within the plurality of time periods; and
  wherein the total engine maintenance cost per time period is less than or equal to the engine budget amount.

22. The apparatus of claim 14, wherein the aircraft asset combination is an optimal aircraft asset combination so that the aircraft asset maintenance schedule results in a minimized cumulative cost summary that is a sum of the total aircraft asset maintenance costs per time period, the total penalty cost per time period, and the total extension cost per time period for every time period in the planning period.

* * * * *